United States Patent
Tanzman et al.

(10) Patent No.: US 7,032,029 B1
(45) Date of Patent: Apr. 18, 2006

(54) METHOD AND APPARATUS FOR AN ACTIVE STANDBY CONTROL SYSTEM ON A NETWORK

(75) Inventors: Allan Tanzman, Newton Centre, MA (US); Dennis J. W. Dube, Pelham, NH (US); Stephen Mooney, West Newbury, MA (US)

(73) Assignee: Schneider Automation Inc., North Andover, MA (US)

( * ) Notice: Subject to any disclaimer, the term of this patent is extended or adjusted under 35 U.S.C. 154(b) by 585 days.

(21) Appl. No.: 09/612,636

(22) Filed: Jul. 7, 2000

(51) Int. Cl.
*G06F 15/16* (2006.01)
*G06F 3/00* (2006.01)
*G06F 11/00* (2006.01)
*G05B 9/02* (2006.01)

(52) U.S. Cl. .................... 709/245; 700/82; 710/10; 714/11

(58) Field of Classification Search ............... 709/217, 709/220, 245; 700/1, 2, 9, 11, 19, 20, 21, 700/82; 710/10; 714/11, 13
See application file for complete search history.

(56) References Cited

U.S. PATENT DOCUMENTS

| | | | |
|---|---|---|---|
| 3,971,000 A | | 7/1976 | Cromwell |
| 4,319,338 A | | 3/1982 | Grudowski et al. |
| 4,521,871 A | * | 6/1985 | Galdun et al. ............. 714/11 |
| 4,688,167 A | | 8/1987 | Agarwal |
| 4,845,644 A | | 7/1989 | Anthias et al. |
| 4,858,152 A | | 8/1989 | Estes |
| 4,897,777 A | | 1/1990 | Janke et al. |
| 4,912,623 A | | 3/1990 | Rantala et al. |

(Continued)

FOREIGN PATENT DOCUMENTS

| | | |
|---|---|---|
| DE | 296 00 609 U1 | 3/1997 |
| DE | 441 0 171 C1 | 4/1997 |
| DE | 196 15 093 A1 | 10/1997 |

(Continued)

OTHER PUBLICATIONS http://www.easydeltav.com/pd/PDS_ControllerRed.pdf "Controller Redundancy" Fisher–Rosemount Systems, Inc. 1996–2003.*
http://www.imispr.com/images/2200.pdf "Redundant Hybrid control System (HCS)" RTP 1999–2000.*

(Continued)

*Primary Examiner*—Marc D. Thompson
*Assistant Examiner*—Tam T. Phan

(57) ABSTRACT

A method and apparatus for providing an active standby control system comprising the steps of providing a first and second programmable logic controller (PLC), each controller having an operating state. Each controller further including a network module board operably connected to a network; a control unit, a remote I/O head; and, a hot standby module, each hot standby module is operably connected together. Operably connecting each programmable logic controller to a network. Assigning a network address identifier, i.e., Internet Protocol or Media Access Control address, to each programmable logic controller and sensing the operating state of each programmable logic controller. The network address identifier of each programmable logic controller is determined by the operating state of each respective programmable logic controller. The present invention is also directed to an apparatus for communication with at least one device which resides on a standard communications network using a standard communications protocol. The apparatus has a scanner for scanning the device, a device scan table for storing data relating to the device, and a standard communications interface for interfacing between the device scanner and the standard communications network using the standard communication protocol.

11 Claims, 11 Drawing Sheets

U.S. PATENT DOCUMENTS

| | | |
|---|---|---|
| 4,937,777 A | 6/1990 | Flood et al. |
| 4,949,274 A | 8/1990 | Hollander et al. |
| 4,953,074 A | 8/1990 | Kametani et al. |
| 4,992,926 A | 2/1991 | Janke et al. |
| 5,012,402 A | 4/1991 | Akiyama |
| 5,023,770 A | 6/1991 | Siverling |
| 5,047,959 A | 9/1991 | Phillips et al. |
| 5,072,356 A | 12/1991 | Watt et al. |
| 5,072,412 A | 12/1991 | Henderson, Jr. et al. |
| 5,109,487 A | 4/1992 | Ohgomori et al. |
| 5,122,948 A | 6/1992 | Zapolin |
| 5,131,092 A * | 7/1992 | Sackmann et al. .......... 709/207 |
| 5,134,574 A | 7/1992 | Beaverstock et al. |
| 5,148,433 A * | 9/1992 | Johnson et al. ................ 714/10 |
| 5,151,896 A | 9/1992 | Bowman et al. |
| 5,151,978 A | 9/1992 | Bronikowski et al. |
| 5,157,595 A | 10/1992 | Lovrenich |
| 5,159,673 A | 10/1992 | Sackmann et al. |
| 5,161,211 A | 11/1992 | Taguchi et al. |
| 5,165,030 A | 11/1992 | Barker |
| 5,179,700 A | 1/1993 | Aihara et al. |
| 5,225,974 A | 7/1993 | Mathews et al. |
| 5,245,704 A | 9/1993 | Weber et al. |
| 5,251,302 A | 10/1993 | Weigl et al. |
| 5,283,861 A | 2/1994 | Dangler et al. |
| 5,297,257 A | 3/1994 | Struger et al. |
| 5,307,463 A | 4/1994 | Hyatt et al. |
| 5,321,829 A | 6/1994 | Zifferer |
| 5,343,469 A | 8/1994 | Ohshima |
| 5,349,675 A | 9/1994 | Fitzgerald et al. |
| 5,386,524 A | 1/1995 | Lary et al. |
| 5,398,336 A | 3/1995 | Tantry et al. |
| 5,406,473 A | 4/1995 | Yoshikura et al. |
| 5,420,977 A | 5/1995 | Sztipanovits et al. |
| 5,430,730 A | 7/1995 | Sepulveda-Garese et al. |
| 5,440,699 A | 8/1995 | Farrand et al. |
| 5,446,868 A | 8/1995 | Gardea, II et al. |
| 5,528,503 A | 6/1996 | Moore et al. |
| 5,598,536 A | 1/1997 | Slaughter, III et al. |
| 5,611,059 A | 3/1997 | Benton et al. |
| 5,613,115 A | 3/1997 | Gihl et al. |
| 5,623,652 A | 4/1997 | Vora et al. |
| 5,625,781 A | 4/1997 | Cline et al. |
| 5,668,952 A * | 9/1997 | Slane ........................ 709/245 |
| 5,699,350 A | 12/1997 | Kraslavsky |
| 5,734,831 A | 3/1998 | Sanders |
| 5,774,640 A * | 6/1998 | Kurio ............................ 714/4 |
| 5,793,954 A | 8/1998 | Baker et al. |
| 5,805,442 A | 9/1998 | Crater et al. |
| 5,862,391 A | 1/1999 | Salas et al. |
| 5,917,997 A * | 6/1999 | Bell et al. ...................... 714/4 |
| 5,926,621 A | 7/1999 | Schwarz et al. |
| 5,950,006 A | 9/1999 | Crater et al. |
| 5,956,491 A | 9/1999 | Marks |
| 5,975,737 A | 11/1999 | Crater et al. |
| 5,982,362 A | 11/1999 | Crater et al. |
| 5,997,167 A | 12/1999 | Crater et al. |
| 6,016,523 A | 1/2000 | Zimmerman et al. |
| 6,028,866 A | 2/2000 | Engel et al. |
| 6,032,203 A | 2/2000 | Heidhues |
| 6,041,287 A | 3/2000 | Dister et al. |
| 6,049,825 A * | 4/2000 | Yamamoto .................. 709/221 |
| 6,058,251 A | 5/2000 | Okamoto et al. |
| 6,061,739 A * | 5/2000 | Reed et al. ................. 709/245 |
| 6,067,620 A * | 5/2000 | Holden et al. .............. 713/155 |
| 6,085,238 A | 7/2000 | Yuasa et al. |
| 6,108,300 A * | 8/2000 | Coile et al. ................. 370/217 |
| 6,108,662 A | 8/2000 | Hoskins et al. |
| 6,122,670 A | 9/2000 | Bennett et al. |
| 6,151,625 A | 11/2000 | Swales et al. |
| 6,151,640 A | 11/2000 | Buda et al. |
| 6,157,864 A | 12/2000 | Schwenke et al. |
| 6,167,406 A | 12/2000 | Hoskins et al. |
| 6,169,928 B1 * | 1/2001 | Olson et al. .................... 700/7 |
| 6,201,996 B1 | 3/2001 | Crater et al. |
| 6,282,454 B1 * | 8/2001 | Papadopoulos et al. ....... 700/83 |
| 6,292,838 B1 * | 9/2001 | Nelson ...................... 709/236 |
| 6,327,511 B1 | 12/2001 | Naismith et al. |
| 6,353,854 B1 * | 3/2002 | Cromer et al. .............. 709/224 |
| 6,430,610 B1 * | 8/2002 | Carter ........................ 709/221 |
| 6,487,623 B1 * | 11/2002 | Emerson et al. ............ 710/302 |
| 6,499,073 B1 * | 12/2002 | Wallach et al. ............. 710/302 |
| 6,594,227 B1 * | 7/2003 | Ogawa et al. .............. 370/216 |
| 6,640,314 B1 * | 10/2003 | Lelaure et al. ................ 714/11 |

FOREIGN PATENT DOCUMENTS

| | | |
|---|---|---|
| EP | 0 542 657 A1 | 5/1993 |
| EP | 0 814 393 A1 | 12/1997 |
| JP | 60192447 | 9/1985 |
| WO | WO 97/18636 | 5/1997 |
| WO | WO 98/53581 | 11/1998 |
| WO | WO 00/41377 | 7/2000 |

OTHER PUBLICATIONS

Cho et al. "Fault Tolerant Control using a Redundant Adaptive Controller" IEEE 1990.*

Kanaya et al. "Vacuum–Pump Control System using Programmable Logic Controllers on the TCP/IP Networks for the 2.5–GEV Storage Ring" IEEE 1999.*

Using World–Wide for Control Systems., F. Momal, C. Pinto–Pereira, AT Division CERN, 1211 Geneva 23, http://mish231.cern.ch/Docs/ICALEPCS/1995/icalep95.htm.

When Technology Standards Become Counterproductive, Kenneth C. Crater, President, Control Technology Corporation, Hopkinton, MA dated Jul. 9, 1999, pages 1–5.

A White Paper State Language for Machine Control, Kenneth C. Crater, President, Control Technology Corporation, Hopkinton, MA dated Jul. 9, 1999, pages 1–11.

New PC–based Process Control & Data Acquisition Software Integrates Remote Internet Capabilities with Fast Pentium Support, Fred A. Putnam, LABTECH President, pages 1–3.

Aug. 1996 CONTROL Magazine –In the News –Electric Utility Industry Embarks on Automation Overhaul, pages 1–10.

Jul. 1997 CONTROL Magazine —Magazine Software Review —NT Package Give Plant Access Through the Web, pages 1–3.

Oct. 1996 CONTROL Magazine —Software Review —Article Archives, pages 1–2.

ICS Instrumentation & Control Systems —Windows NT for real–time control: Which way to go?–ICS Magazine, pages 1–8.

I&CS Jul. 1999 —SPECIAL REPORT SOFTWARE —Software: Open source OSs, objects, Web–based communications challenge status quo, (Wayne Labs, Senior Technical Editor), pages 24–49.

Landis & Staefa MS 2000, pages 1–2.

Landis & Staefa Standards and Open Protocols Integration System Architecture, p. 1.

Annabooks Bookstore, Programming and Interfacing the 8051, by Sencer Yeralan and Asutosh Ahluwalia, pp. 1–2.

SoftPLC Corporation —Java Support in SoftPLC Corp. Products, pp. 1–5.

Mach J. Company, MachJ, an enbeddable, clean room Java Virtual Machine, p. 1.

SoftPLC Corporation —The History of Programmable Controllers, Looking Back From the Year 2000 A.D. (Or, How Computers Replaced Proprietary PLC'S), pp. 1–7.

SoftPLC Corporation —TOPDOC: Advanced PLC program development & documentation software, pp. 1–12.

Control Engineering Online Magazine Articles (Jul. 1998) —No. that's not a PC, it's a PLC, pp. 1–2.

Rockwell International Corporation, Allen–Bradley Introduces PLC–5/80E Controller for Ethernet Communication Networks.

Rockwell Automation —Search Results, pp. 1–2.

Rockwell International Corporation, Vision & Direction, The Direction of Automation Systems, pp. 1–4.

Rockwell International Corporation, Vision & Direction, The Role of Open Systems, pp. 1–4.

Rockwell International Corporation —Vision & Direction —The Direction of Automation Systems —Emergence of Application–Specific Control Solutions, pp. 1–2.

Rockwell International Corporation —Vision & Direction —The Direction of Automation Systems —The New Factory Worker, pp. 1–2.

Rockwell International Corporation, Vision & Direction, Coontrol System Deliverables —The Next Step, pp. 1–2.

Rockwell International Corporation, Vision & Direction, Conclusion & Acknowledgements, pp. 1–2.

Rockwell International Corporation —Choices —Perspectives on the Future of Automation Control, p. 1.

Rockwell International Corporation —Allen—Bradley— Networks —Ethernet for Industrial Control —An Ethernet —An Ethernet White Paper —Apr. 21, 1998, pp. 1–13.

Rockwell International Corporation —Automation Systems Control —General —World —Class Automation Systems from Allen—Bradley, Last Updated: May 7, 1998, pp. 1–12.

PC Quest, Dec. '97 —Point, click, Control —C–Programmable controllers take the pain out of embedded control, pp. 1–2.

berthel —automation with imagination —PCI 100 —Programmable logic controller for SIMATIC/IBM IPC, pp. 1–3.

YAHOO !Personalized Search Results for progammable logic controller internet access, pp. 1–3.

SIEMENS —SIMATIC report Jan./1997 —New in the SIMATIC Library, pp. 1–2.

CONTROL Magazine Aug. 1998 —Field Test —DYNAMIC SOFTWARE MAKES CONTROL INTEGRATION EASIER, pp. 1–2.

Design and Reuse Web Site —EDTN Network —Analyze IP Database Content —Analyse Reuse Blocks per taxonomy tree, pp. 1–10.

Engineering Information, Inc. —Ei CPX WEB [1990–94]. Using World Wide Web for Control Systems, F. Momal, C. Pinto—Pereira, AT Division CERN, 1211 Geneva 23, http://mish231.cern.ch/Docs/ICALEPCS/1995/icalep95.htm.

"Ethernet Base Gateway Product," AEG–Modicon, published 1991.

"Modicon Modbus Plus Network BM85 Bridge Multiplexer User's Guide,"Groupe Schneider, Aug. 1995.

"Modicon Modus Plus Network Planning and Installation Guide," AEG Schneider Auotmation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB—TCP Installation and Programming Manual," Niobara Research and Development Corporation, Oct. 1, 1997.

"Internet Protocol, Darpa Internet Program, Protocol Specification —RFC:791,"Defense Advanced Research Projects Agency, Sep. 1981.

"Transmission Control Protocol, Darpa Internet Program, Protocol Specification —RFC:793,"Defense Advanced Research Projects Agency, Sep. 1981.

"Open MODUS/TCP Specification," *A. Swales,*Sep. 3, 1997.

"[comp.unix.programmer]Unix–Socket—FAQ For Network Programming," Vic Metcalfe, Andrew Gierth and other contributors, Jan. 22, 1998.

"TCP/IP Illustrated, vol. 2, The Implementation," Gary R. Wright, W. Richard Stevens, 1997.

"Winstock 2 Information," Bob Quinn, 1995–1998 (last updated Dec. 5, 1998).

Website Information of PROFIBUS: Technical Overview.

Website Information of ODVA —The Open DeviceNet's Vendor Association.

Website of PROIBUS International —Welcome Page.

Lab VIEW Graphical Programming for Instrumention, Networking Reference Manual, ©Copyright 1993, 1994 National Instruments Corporation, Part Number No. 320587B–01, Sep. 1994.

Lab VIEW Graphical Programming for Instrumention, Tutorial for Windows. ©Copyright 1993, 1994 National Instruments Corporation, Part No. 320593B–01, Sep. 1994.

Lab View Graphical Programming for Instruction, Data Acquisition VI Reference Manual for Windows, ©Copyright 1992, 1994 National Instruments Corporation, Part No. 320536B–01, Sep. 1994.

Abstract of "Process Control takes to the Net," Greg Paula, Mechanical Engineering vol. 118 No. Dec. 12, 1996, p. 55

Abstract of "Remote interrogation and control of sensors via the internet," Peter L. Furth and Euan F. Mowat; Sensors, vol. 12 No. 12, 6 pp; Dec. 1995.

Abstract of "Process control takes to the Net," G. Paula; Mechanical Engineering, vol. 118, No. 12, p. 55, Dec., 1996.

Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185–7, 1996.

Abstract of "Managing interdisciplinary project teams through the Web," R. E. Goodman and P. Chinowsky; Conference Paper, WebNet 96 —World Conference of the Web Society, pp. 180–5, 1996.

Abstract of "Learning environment for a process automation system using computer networks," J. Lindfors, L. Yliniemi and K. Leivska; Conference Paper, Step '96 —Genes, Nets and Symbols, pp. 137–43, 1996 (Finland).

* cited by examiner pcs → xmit_state state machine: once a path has been submitted into the xfifo{ }, it cannot be removed. But the background can abort the packet, as long as it is not in the XMTBID or XMTSEND state. These states should not persist.

METHOD AND APPARATUS FOR AN ACTIVE STANDBY CONTROL SYSTEM ON A NETWORK

RELATED APPLICATIONS

This patent application claims priority to U.S. Patent Application No. 09/224,196, filed Dec. 30, 1998, entitled, "Input/Output (I/O) Scanner For A Control System With Peer Determination," now U.S. Pat. No. 6,327,511, issued Dec. 4, 2001.

TECHNICAL FIELD

The present invention relates to a control system incorporating programmable logic controllers (PLC). More particularly, the present invention relates to backup PLCs on a network.

Additionally, the present invention relates to an apparatus and method for determining the type of a communication device using known communication protocols over standard networks, and for moving data, relating to input and output (I/O) devices within the control system, to and from a programable logic controller.

BACKGROUND OF THE INVENTION

Within control systems, there has a need to make I/O devices and modules, programmable logic controllers (PLCs), and other devices capable of being used on standard communications protocols, such as Ethernet, TCP/IP, and others. This includes the ability to interface a proprietary communications protocol with standard protocols. Previous I/O scanners within such devices, typically used proprietary control networking protocols. Using proprietary control networking protocols, resulted in high installation costs, low ease-of-use, and compatibility problems with other devices/systems used in control systems, such as in factory automation applications. U.S. Pat. No. 5,159,673 (Sackman et al.), U.S. Pat. No. 4,992,926 (Janke et al.), U.S. Pat. No. 4,897,777 (Jamke et al.), U.S. Pat. No. 5,245,704 (Weberet al.), U.S. Pat. No. 4,937,777 (Flood et al.), U.S. Pat. No. 5,307,463 (Hyatt et al.), and/or U.S. Pat. No. 5,805,442 (Crater et al.) provide some background and context for the present invention.

PLCs have been implemented in duplex or back-up system configurations for several years. Typically, the duplex configuration incorporates a pair of PLCs assembled in a hot or active standby, or back-up, configuration wherein one PLC is operating in a primary mode and the other PLC is functioning in a secondary or standby/backup mode. System failures involving the primary mode PLC that can shut down the control system are avoided by having a back-up PLC readily available in hot/active standby mode to replace the failing primary mode PLC.

Factory automation systems are increasingly being integrated with communication networks. Control systems are being implemented on networks for remote monitoring and control of devices, processes, etc. Signal communication between devices on a network requires network address identifiers, i.e., Internet Protocol address, Media Access Control address; to be assigned to these devices throughout the network.

Network problems arise when a device or PLC fails and must be replaced. The failing network PLC cannot be readily exchanged with a PLC configured in active standby because the network address identifier assigned to the PLC to be removed is not readily associated with the active standby PLC.

The present invention is provided to solve these and other problems.

SUMMARY OF THE INVENTION

The present invention is a method and an apparatus for exchanging programmable logic controllers (PLC) of a control system configured in an active standby, duplex or redundant set-up on an Internet Protocol (IP) network. Accordingly, the associated network address identifier of the PLCs are also exchanged. The control system operates normally until a failure in the primary mode PLC is detected. Upon detecting a primary mode PLC failure, the secondary mode PLC configured in active standby is substituted in place of the failed primary mode PLC, along with the associated IP address. The exchanging of the PLCs is accomplished without significantly disrupting the performance of the overall control system by substantially suspending or delaying the network's operation. Alternatively, the Media Access Control (MAC) address of controllers can also be exchanged.

It is an object of this invention to provide an active standby control system integrated on a network capable of replacing a PLC unit without significantly disrupting the performance of the control system or the communication network.

In accordance with the present invention, a method of providing an active standby control system comprises the step of providing a first and a second programmable logic controller, each controller having an operating state. The method also includes operably connecting each programmable logic controller to a network. The method further includes assigning a network address identifier, i.e., Internet Protocol address, to each programmable logic controller and sensing the operating state of each programmable logic controller, wherein the Internet Protocol address of each programmable logic controller is determined by the operating state of each respective programmable logic controller.

A further embodiment of the present invention includes each programmable logic controller comprising a network module board operably connected to the network, a control unit, a remote I/O head and a hot, or active, standby module. Each hot standby module is operably connected together.

The present invention is also directed to an apparatus for communication with at least one device which resides on a standard communications network, such as an Ethernet network, using a standard communications protocol, such as TCP using Modbus. The apparatus has a scanner for scanning the device, a device scan table for storing data relating to the device, and a standard communications interface for interfacing between the device scanner and the standard communications network using the standard communication protocol.

The present invention is also a device scanner for a first device located on a first node of a standard communications network. The device scanner is provided for scanning devices on the standard communications network, and for identifying a second device on a second node of the standard communications network. The device scanner has an initiator for initiating a first communications command in a peer protocol format to the second node, a receptor for receiving from the second node a second communications command in the peer protocol format, in response to the first communications command, and an identifier for identifying the second device on the second node as a peer device. This apparatus and device can be used within a control system for monitoring input devices and for controlling output devices which reside on the standard communications network, as will be described in detail below.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION OF THE PREFERRED EMBODIMENT

Figure 1:
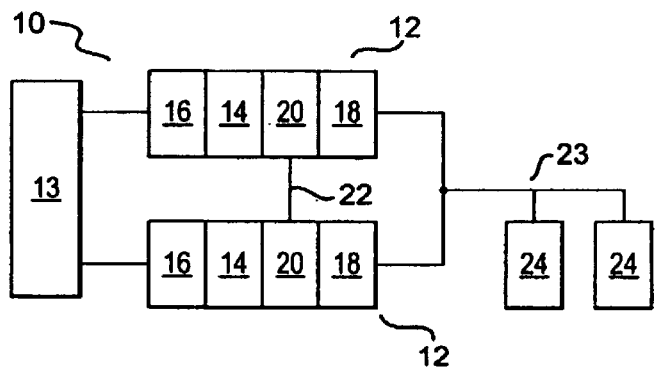
FIG. 1 is a block diagram showing an active standby control system network.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The subject matter of the present application is related to the following commonly assigned applications: U.S. patent application Ser. No. 08/927,005 filed on Sep. 10, 1997, entitled "Web Interface To A Programmable Controller;" U.S. patent application Ser. No. 09/224,196 filed Dec. 30, 1998, entitled "Input/Output (I/O) Scanner For A Control System With Peer Determination;" U.S. patent application Ser. No. 09/303,458 filed Apr. 30, 1999, entitled "Web Interface To A Programmable Controller;" U.S. Pat. No. 6,061,603 issued May 9, 2000, entitled "A System For Remotely Accessing An Industrial Control System Over a Commercial Communications Network" (Divisional Application of above cited U.S. patent application Ser. No. 08/927,005);" and U.S. patent application Ser. No. 09/477,113 filed Dec. 31, 1999, entitled "Dual Ethernet Stack For Maximum Speed Access To A PLC." The contents of these Applications are expressly incorporated herein by reference.

Programmable logic controllers (PLC) 12 have been integrated with control systems in an active, hot standby or backup configuration wherein the primary controller can be swapped or exchanged by operator personnel with a readily available backup controller when a failure to the primary controller is detected. Factory automation networks allow operator personnel to monitor the control system from a remote site. In the active standby configuration, a pair of controllers are arranged in communication with each other. One of the controllers is designated a primary controller and is active on the network while the other controller is in a hot standby mode for backing up the primary controller. If the primary controller fails or is taken out of service, the backup controller will be swapped in its place. An additional concern for network devices is the network address identifier associated with each network device. Each individual device on the network is assigned a network address identifier, preferably an Internet Protocol (IP) address. Thus, the exchange of a controller on the network also requires the exchange of its assigned IP address.

An active standby control system 10 is shown in FIG. 1. The system 10 includes a pair of controllers 12 operably connected to a network 13, preferably Ethernet, in a hot standby, back-up, redundant configuration. Each PLC 12 includes a control module 14, a network module 16, a remote I/O head 18 and a hot standby module 20. The hot standby module 20 of each PLC 12 are operably connected to each other, preferably via a fiber optic cable 22. The respective remote I/O heads 18 are also connected to each other, and to the remote I/O network 23, i.e., drops 24.

The network module boards 16 shown in FIG. 1 are operably connected to the network 13. The network module board 16 of each respective PLC 12 must communicate with each other to successfully exchange their respective IP addresses. A failure in communication between the network module boards 16 increases the amount of time required to swap the PLCs 12. To minimize the risk of failure, the network module boards 16 are preferably connected to the same switch (not shown). However, this is not required and multiple switches dedicated to each PLC 12 can be used. Within the preferred embodiment, the only requirement for these switches is that they reside within the same subnetwork. In addition, the sequence order of the module units within each PLC rack are the same and any software revisions to the PLCs 12 must be the same.

Each PLC's 12 control module unit 14 has three operating states. They are: primary, secondary and offline. In the primary state, the control module 14 is running and exchanging I/O data over the remote I/O network 23. In the secondary state, the control module 14 is running, but is not exchanging I/O data over the remote network 23. When the primary controller 12 changes from primary to secondary or offline, the network module boards 16 will swap their respective IP addresses. The new primary controller 12 will resume scanning. When the network module boards 16 exchange IP addresses, it appears to remote nodes 24 as if the network module board 16 has been reset. The state of the secondary controller 12 will automatically transition to the primary state if the primary mode PLC's control module 14 leaves the primary state.

The primary control module 14 can exit the primary state either due to a hardware failure or a self-check failure within the PLC 12. In addition, operator personnel can instruct the control system 10 to change the state of the primary control module 14. A control module 14 in the offline state cannot enter the primary state without first going through the secondary state. The allowable hot standby state transitions for the PLCs 12 are: one PLC 12 is in the primary state and the other PLC 12 is in the secondary state; one PLC 12 is in the primary state and the other PLC 12 is in the offline state; and both PLCs 12 are in the offline state.

When a swap occurs, the primary will reset the IO scanner's connection prior to exchanging the IP addresses.

This will minimize the time required by the new primary IO scanner to establish a connection. The time to reset the IO scanner's connection is in the order of several milliseconds.

When the controller 12 changes from secondary to primary mode, the network module board 16 will change its IP address within ten to fifteen milliseconds. The exchange in IP addresses requires the network module board 16 to perform various cleanup activities. The client and server will return various resources to the operating system, and if necessary, to auto logout of the controller prior to processing new server and client requests. The other tasks such as the FTP server, and HTTP server, by use of a keep alive timer, will close connections and perform the necessary clean up. Note that, for both the FTP and HTTP deamon, new requests can be serviced while the old connections are being cleaned up. The IO scanner will establish new connections and start scanning within 200 milliseconds.

When the controller changes from primary to secondary mode, the network module board 16 will perform a warm restart. This is the best way to insure that all resources are properly cleaned up.

Table 1 shows the clean up times for the new primary network module board 16.

TABLE 1

Cleanup Time for Primary Network Module Board

| Task | Cleanup Time |
| --- | --- |
| Http Server | 150 seconds for the old secondary connections. New connections can be accepted |
| Ftp Server | 150 seconds for the old secondary connections |
| Snmp | 0 seconds |
| Modbus Client | 20 milliseconds to release TCP/IP resources. After releasing resources, new MSTR blocks can be processed |
| Modbus Server | 20 milliseconds to release TCP/IP resources, and auto logout. After releasing resources, new server requests can be processed. |
| IO Scanner | 200 milliseconds to establish new connections and commence scanning |

The network module board 16 coordinates the swapping of the IP addresses assigned to the PLCs 12. The mode of the network module board 16 is determined by the respective control modules's 14 hot standby state. The network module board 16 may be in one of the following three modes.

1. Non-redundant mode. In this mode, the network module board 16 functions as single unit. This is the case when the network module board 16 is attached to a non-redundant, or stand alone system configuration. It can also occur when the network module board 16 is attached to a redundant system. If there is no TCP/IP configuration extension in the redundant system, the network module board 16 will always stay in the non-redundant mode. If the hot stand by status word indicates that no hot standby module 20 is present, or if the hot standby module board 20 is unhealthy, then the network module board 16 will be in the non-redundant mode.

2. Secondary mode. The network module board 16 is in the secondary mode when the hot standby state is secondary or offline. All tasks except the IO scanner are active.

3. Primary mode. The network module board 16 is in the primary mode when the hot standby state is primary. All tasks are active including the IO scanner.

The main difference between the primary and secondary network module board's 16 mode is the I/O scanner. Only in the primary mode, will the IO scanner scan the IO devices. In secondary mode, the IO scanner is not active. In both the primary and secondary, the client task will process MSTR blocks. Likewise the server will process modbus requests.

The hot standby state of the PLC 12 is determined by the network module 16 at the end of an I/O scan. Each network module 16 sends a User Datagram Protocol (UDP) message to its peer network module 16 after the closing of client connections, server connections, and if necessary, the scanner connections. The network module 16 then waits with a time-out for its peer's swap UDP message response. After receiving the messages or after a short time-out, the network module board 16 exchanges the originally assigned IP address of the replaced PLC 12 with the IP address of the replacement PLC.

The actions performed by the controller 12 depend upon which event occurs. For example, when the PLC 12 receives a swap UDP message it must exchange its IP address with the other controller 12. The TCP/IP connections are closed, the swap UDP message is sent, and the IP addresses are exchanged. There are also conditions where the control unit's 14 hot standby state can change, but the controller 12 may determine that the IP address must remain the same. This can occur when hot standby state changes from secondary to offline. In this case, the PLC 12 performs no actions and continues operating. However, if the network module 16 detects that the new hot standby state is either primary or secondary, the network module 16 will change the IP address after closing the PLC's TCP/IP connections and receiving and transmitting swap UDP messages.

The time required to hot swap IP addresses between PLCs includes the time to close the TCP/IP connections, i.e., client, server, remote I/O; to swap IP addresses and to reestablish connections. Typically, it takes 6 mS to swap IP addresses. Re-establishing connections is dependent on the network's topology, the remote devices and the I/O scan time. I/O scanning starts to re-establish connections one scan at a time after the IP addresses are swapped.

Each network module board 16 works in conjunction with the hot standby control module 20. The network module boards 16 are each assigned a network address identifier, preferably an IP address, determined by the current local hot standby state of the PLC 12. The network module board's 16 address is either the configured IP address or the configured IP address +1. If the PLC 12 is in the offline state, the IP address is determined by whether or not the peer PLC 12 is transitioning to the primary state.

The network module 16 does not participate in the hot standby swap of the PLCs 12 if there is not a TCP/IP configuration extension table available. The PLC determines whether a TCP/IP configuration extension table exists. If not, or if the "force BOOTP" field of the configuration extension table is set to "true," then the PLC initially attempts to get an IP address from the BOOTP server. If the PLC obtains an address from the BOOTP server and there is no configuration extension table, then the control system operates and will remain in the non-redundant. If there is no response from the BOOTP server and there is no configuration extension table, the network module 16 derives its IP address from the Media Access Control (MAC) address and operates in the non-redundant mode.

The network module 16 does participate in the hot standby swap of the PLCs 12 if there is a TCP/IP configuration extension table available. The configuration extension table lists the IP addresses and resides in each PLC's 12 non-volatile memory. The control system 10 either obtains an IP address from the configuration extension table or from the BOOTP server if the force BOOTP field in the configuration extension table is true. If the network module 16 obtains an address from the BOOTP server and there is no configuration extension table, then the network module 16 operates in the non-redundant mode and will always remain in the non-redundant mode. In either case, the IP address used by the control system 10 when the system comes online is determined by the hot standby status word and the hot standby state. If the "force BOOTP" field in the TCP/IP configuration extension table is clear, then the network module 16 obtains its IP address from the TCP/IP configuration extension table.

During the power up sequence, the PLC examines the hot standby status and the state word. These values determine the mode of the PLC as shown by the Table 2 below. The network module 16 determines if the network module 16 has a TCP/IP configuration extension. If there is no configuration extension, or the configuration extension force BOOTP field is true, then the network module 16 first attempts to get an IP address from a BOOTP server. If there is no response from the BOOTP server and there is no configuration extension, the network module 16 derives its IP address from the MAC address and operates and remains in the non-redundant mode.

TABLE 2

| Hot Standby Status | Hot Standby State | PLC Mode |
|---|---|---|
| Hot standby module is not present or not healthy | Don't care | Stand-Alone |
| Hot standby module is present and healthy | Unassigned or Offline | Offline |
| Hot standby module is present and healthy | Primary | Primary |
| Hot standby module is present and healthy | Secondary | Secondary |

If there is configuration extension table, then the network module 16 either obtains an IP address for the configuration extension table or from the BOOTP server if the force BOOTP field in the configuration extension table is true. In either case, the IP address of the network module 16 is determined by the controller's hot standby status word and the hot standby state contained in the status word. Table 3 below shows how the IP address is determined.

TABLE 3

IP Address Determination

| Hot Standby Status | Hot StandBy State | IP Address |
|---|---|---|
| Hot standby module 20 not present or not healthy | Don't care | IP address is the address in the configuration extension table or the address from the "force BOOTP request". |
| Hot standby module 20 present and healthy | Unassigned | There is no IP address for the network module. The network module will not come online. See the power up sequence below. |
| Hot standby module 20 present | Primary | The IP address is the address in the configuration extension table or the address from the BOOTP request. |
| Hot standby module 20 present | Secondary or Offline | One is added to the IP address in the configuration extension table or the address from the BOOTP request. |

If the user wants the network modules in a redundant system to use a BOOTP server by setting the configuration extension BOOTP field to true, then the BOOTP server must be configured with the same IP address for both MAC addresses. Before using the IP address, the network module 16 checks that there is no duplicate address on the network.

TABLE 4

Network Module Mode Determination

| Hot Standby Status | Hot Standby State | Network Module MODE |
|---|---|---|
| Hot standby module not present or not healthy | Don't care | Non-redundant (stand alone) |
| Hot standby module present and healthy | Unassigned | Offline |
| Hot standby module present and healthy | Primary | Primary |
| Hot standby module present and healthy | Secondary or Offline | Secondary |

Note that the network module 16 mode reflects the control module's hot standby state. The following steps are the power up sequence when a TCP/IP configuration table is present.

1. Waits until the network module 16 mode is not Offline
2. Determine the network module's IP address as described above.
3. Check for duplicate IP address. If there is a duplicate IP address, blink an error code. Wait until the network module's 16 mode changes. (if there is no configuration extension, the network module's 16 mode doesn't change.) When it changes go to step two.
4. The network module 16 is now online The network module 16 determines if there is a duplicate IP address using gratuitous address resolution protocol (ARP) messages.

After powering up the network module 16 starts the client, server, http sever, and the ftp server. The initial mode is determined by the power up sequence. The network module 16 then enters the non-redundant mode, the primary mode or the secondary mode. The controller hot standby status word causes the network module 16 to change between the modes. When an exchange occurs between the primary and secondary, it is the network module 16 in the secondary mode that drives the switch of the IP addresses. The network module 16 in the secondary mode sends a message to the network module 16 in the primary mode requesting it to switch to the secondary mode.

When the network module 16 is in primary mode, and it is switching to secondary mode, it closes the IO scanner connections and then performs a soft reset. When the network module 16 is in secondary mode, and after it switches to primary mode it performs cleanup operations for the client and server. The clean up includes freeing TCP/IP sockets. No client requests are transmitted or server requests processed until this cleanup is complete. For both the HTTP and FTP server, open connections are closed. A keep alive timer is used to close the open connections. However both servers will accept new connections provided the limit of the number of open connections is not reached.

When the network module 16 leaves a mode that involves a change in its IP address, the network module 16 must close the connections. For the HTTP and FTP server tasks, the network module 16 connections can be closed with keep alive timers.

The remote nodes are responsible for closing their connections. This will not be a problem since a person is involved with HTTP and FTP requests.

In the case of the client and server, the network module 16 will reset the external connections attempting to ensure that the remote connections are also closed. The server and client will also use keep alive timers to detect a dead connection.

The secondary mode is described first, since it drives the exchange of the controllers 12. The network module 16 remains in secondary mode until the hot standby state described above changes to the primary state. If the hot standby state changes to any other state, the network module 16 remains in the secondary mode because the network module 16 assumes it is in a hot standby system. The following table shows the events that occur in the secondary mode, and the actions it performs.

TABLE 5

Secondary Event Table

| Event | Action |
|---|---|
| Hot Standby Status changes to Primary | Send three UDP switch messages to the primary. Start a 20 millisecond timer |
| Twenty millisecond Timer Expires or receive UDP switch response message from primary. | Swap IP address, Send gratuitous ARP message. Start a 5 second timer. Enter primary mode. |

The network module 16 remains in primary until either the controller's hot standby changes to secondary mode or it receives the UDP switch message from the secondary network module 16. If the primary mode was entered from the secondary mode, the five second timer started in the secondary mode will expire. This can indicate that another gratuitous ARP message should be sent. The following table, Table 6, shows the events that occur in the primary mode, and the actions performed.

TABLE 6

Primary Event Table

| Event | Action |
|---|---|
| 5 Second gratuitous ARP message expired. | Send another gratuitous ARP message. If less than 5 ARPs have been set, start the 5 second timer |
| Hot Standby Status changes to secondary or offline | Start a short timer (30–50 msec.). Start closing the IO scanner connections. |
| Short timer expired | Perform a warm start. |
| Receive UDP swap message from the secondary | Finish closing the scanner connections if necessary. Send swap confirm message to secondary. Perform a warm start. |

It is also contemplated that the impact of the swap on the client and server applications can be minimized by porting the applications to the short stack of the server. Prior to a swap, the primary can send the short stack state status to the secondary. Expanding on this, both the client and server task can be ported to us the short stack. With the transfer of state information, the number of connections to be broken for the client and server task will be minimized.

The assigned IP addresses upon power-up for all but the offline state is provided by the configuration extension table. The IP address is determined by which controller 12 powers up first, or if both PLCs 12 power up simultaneously, a "resolution algorithm" determines the respective IP addresses. The IP address at power-up in the offline state is shown in Table 7.

TABLE 7

| Offline State Power-Up Sequence | Result |
|---|---|
| PLC 1 powers-up before PLC 2 | IP address of PLC 1's control module unit is the configured IP address + 1 and the IP address of PLC 2's control module unit is the configured IP address |
| Both PLC 1 and 2 power-up at the same time | The resolution algorithm will assign one PLC the configured IP address and the other PLC the configured IP address + 1. |

After powering up, the PLC 12 starts the client, server, http server and the FTP server. The initial mode is determined during the power up sequence. The PLCs 12 then enter either the stand-alone, primary, or secondary mode and each one of the modes consists of a state machine. During a mode switch between the primary mode PLC and the secondary mode PLC, the secondary mode PLC drives the switch of the respective IP addresses, and alternatively, the MAC addresses. The secondary mode PLC sends a message to the primary mode PLC requesting the switch of the PLCs.

Figure 2:
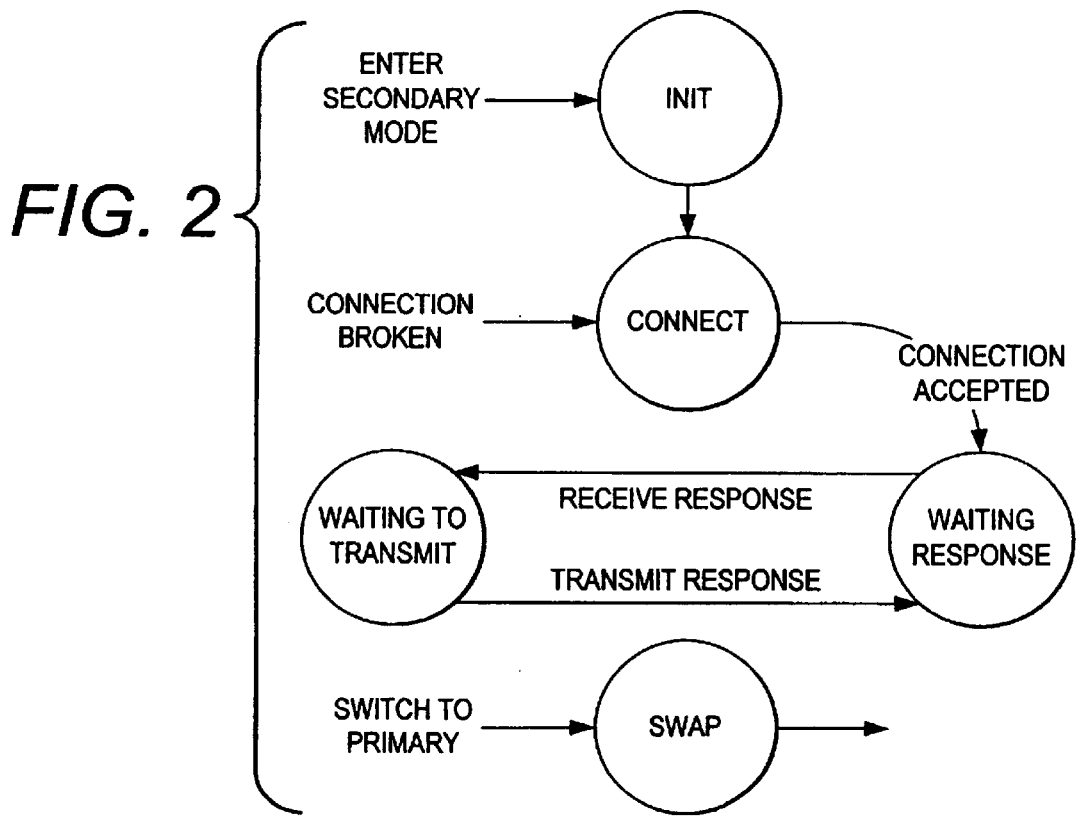
FIG. 2 is a state transition diagram for the secondary mode of the present invention.
Figure 3:
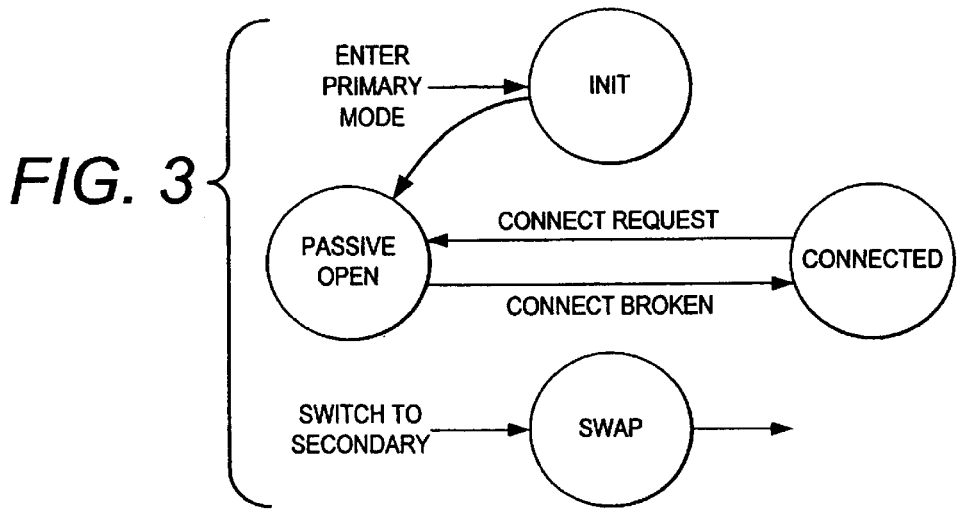
FIG. 3 is a state transition diagram for the primary mode of the present invention.

FIGS. 2 and 3 illustrate state transition diagrams for the secondary and primary modes during the exchange of an IP or MAC address in an alternative embodiment of the invention. The states, Initial, Connecting, and Swap have events causing transitions to these states, but do not show the "from" state. The "from" state for Connecting and Swap states is any one of the states of the secondary mode, e.g., the Init state is entered from any of the other modes.

The Initial (Init) state is entered when the mode of the PLC 12 changes to secondary mode. This occurs when the PLC powers up in the secondary mode or a primary PLC has switched to the secondary mode. In the Init state, the PLC 12 performs the necessary initialization. The I/O scanner task will not scan any devices. Upon completing the initialization, the PLC 12 sends a connect request to the primary mode PLC 12 and enters the Connecting state.

The Connecting state waits for the primary mode PLC 12 to complete the connection. Independent of the state the PLC 12 is in while in the secondary mode, a broken connection always transitions the PLC 12 into the Connecting state. The state transition matrix for the Connecting state is shown below:

| Connecting State | | |
|---|---|---|
| Event | Action | New State |
| Connect accepted | Transmit request for MAC address; Start a response timer. | Waiting Response |
| Connect request failed | Transmit a new contact request | Connecting |
| Connection broken (from any state) | Transmit a new connect request; this action occurs from any other state and transitions into this state. | Connecting |

In the "Waiting Response" state, the secondary PLC has transmitted a request to the primary PLC for its MAC address and is waiting for a response. The state transition is as follows:

| Waiting Response State | | |
|---|---|---|
| Event | Action | New State |
| Receive response | If valid response, save MAC address, start a ten second timer | Waiting to Transmit |
| | If invalid response, do nothing | Waiting for Response |
| Response timer expires | Transmit a new request, start a new response timer | Waiting for Response |

The PLC exits a Waiting to Transmit state when a ten second timer expires. While in the secondary mode, the secondary PLC requests the primary PLC's MAC address six time per minute.

| Waiting to Transmit | | |
|---|---|---|
| Event | Action | New State |
| Ten second timer expires | Transmit a request for the remote MAC address, start the response timer | Waiting for Response |

The Swap state is entered from any state when the PLC 12 detects that its control module unit 14 is changing from a secondary to a primary state. When this occurs, the following actions are performed upon entering the Swap state.
1. Start a 250 mS timer.
2. Transmit a swap event message to the "primary" peer PLC.
3. Reset the client and server connections.
4. The state machine Swap state is as follows:

| Event | Action | New Mode |
|---|---|---|
| Received swap response | Swap MAC and IP address | Primary Mode |
| 250 mS timer expired | Swap MAC and IP address | Primary Mode |

Swap

When the PLC switches to the secondary mode, it uses the MAC address of the secondary machine unless it was not able to obtain the MAC address because of an error condition. The PLC 12 remains in the primary mode until the hot standby state described above changes to the secondary mode. If the hot standby state changes to any other mode, the PLC 12 remains in the primary mode.

The state transition diagram for the primary mode is illustrated in FIG. 3. Not all events are shown. The states Init and Swap have specific events causing transitions to these states, but do not show the "from" state. The "from" state for the Swap state is any one of the states of the primary mode. The Init state is entered from any of the other modes.

The Init state is entered when the mode of the PLC 12 changes to primary mode. This occurs when the PLC 12 powers up in the primary mode, or the secondary PLC changes to the primary mode. In the Init state, the PLC 12 performs the necessary initialization. The I/O scanner will scan the TCP/IP network and upon completing the initialization, open a socket and passively wait for an incoming connect request in the Passive Open state.

In the Passive Open state, the primary PLC is waiting for the secondary PLC to establish the connection. After the secondary PLC establishes a connection, the secondary PLC sends requests to the primary PLC for its MAC address. The request contains the secondary PLC's MAC address.

| Passive Open | | |
|---|---|---|
| Event | Action | New State |
| Incoming connect request | Accept the connection | Connected |

In the Connected state, the PLC receives commands from the secondary PLC and processes the commands. The connection may break, and the primary PLC may not detect it. It will however receive a new connect request from the secondary PLC since the secondary establishes a new connection whenever the connection is broken. The state transition matrix is as follows:

| Connected | | |
|---|---|---|
| Event | Action | New State |
| Request MAC address | Respond to the MAC address, save the MAC address of the secondary | Connected |
| Swap message request | Save the fact that a swap message has been received | Swap |
| Connect request | Close the old connection | Swap |
| Connect broken | Close the socket | Passive Open |

The Swap state is entered when the PLC 12 has detected that the control module unit 14 has changed to the secondary state or that the PLC 12 received a Swap message. Upon entering the Swap state, the PLC performs the following actions:
1. Start a 500 mS timer
2. Shut down the Client, Server, HTTP daemon, FTP and the Scan task.

Shutting down the tasks must be done in such a way that the resources allocated by these tasks are released.

The state transition matrix for the Swap state is as follows:

| Event | Action | New Mode |
|---|---|---|
| 500 mS timer expired | Swap MAC and IP address | Secondary mode |
| Received Swap request (if this event happened in the connected state then the action for this entry is performed after initialization into this state | Swap MAC and IP address | Secondary mode |

When the control system is configured in an active standby set-up, only the primary PLC 12 scans the I/O network. When the PLC's control module unit 14 exits the primary hot standby state, the I/O scanner stops scanning and closes all the connections. When the control unit 14 enters the primary state, the I/O scanner establishes connection and starts scanning.

Figure 4:
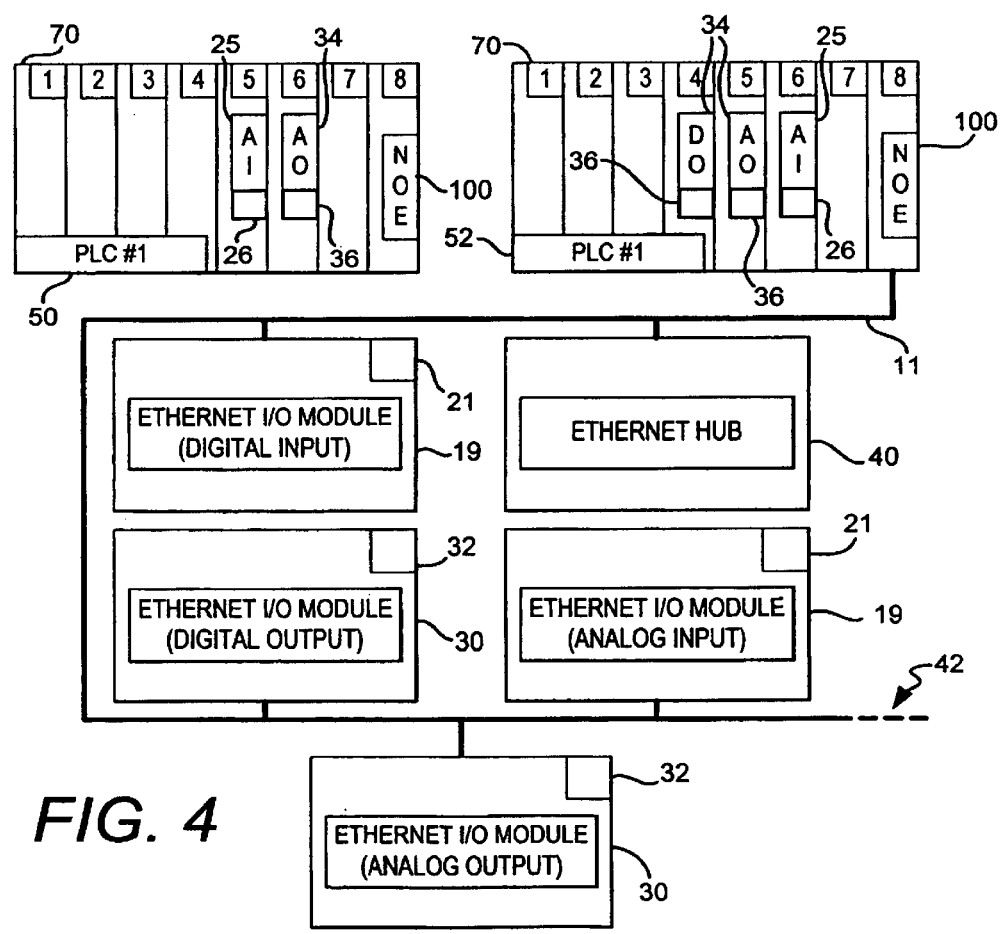
FIG. 4 is a functional block network diagram of an example of a control system network over Ethernet of the present invention.
Figure 5:
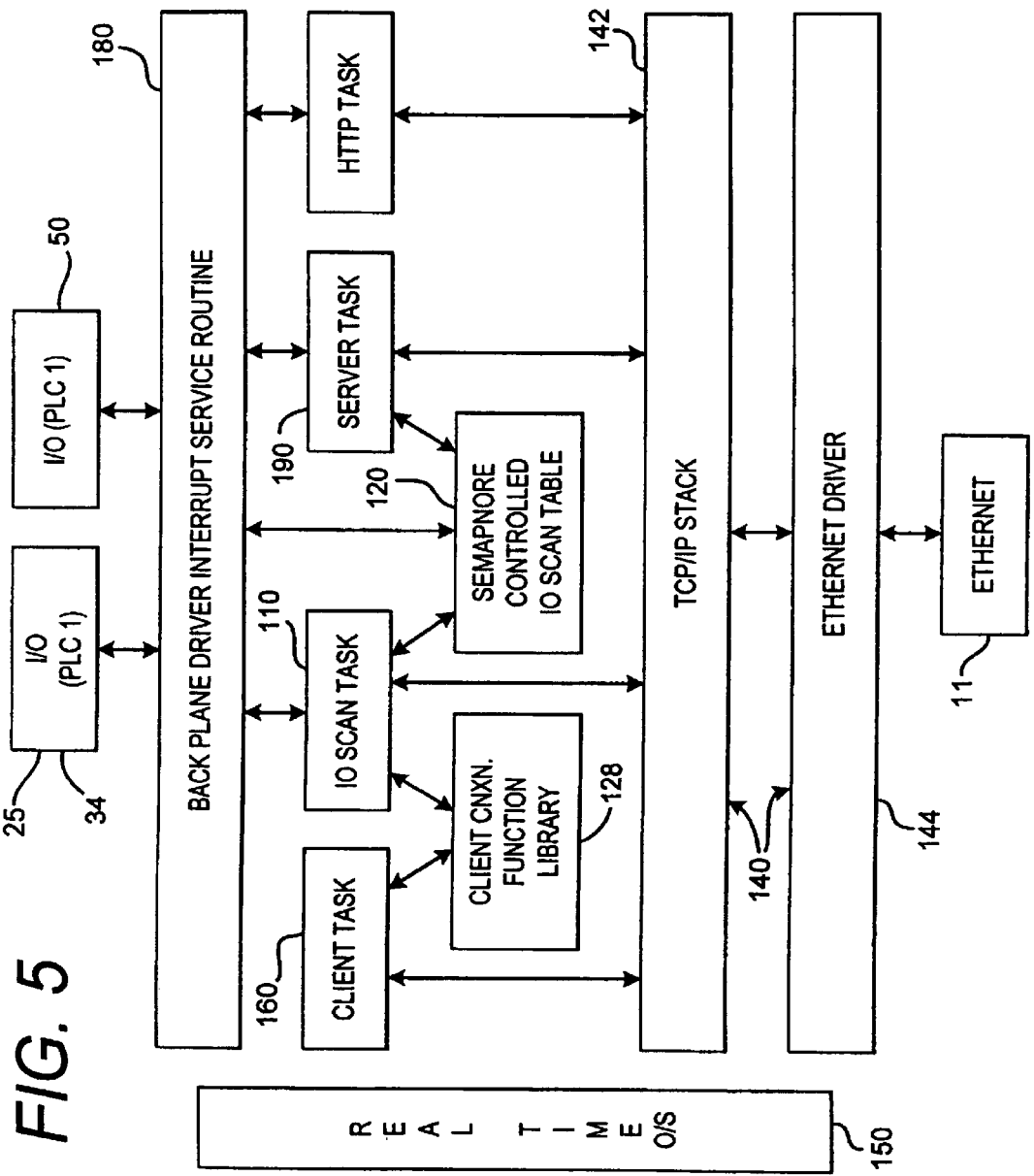
FIG. 5 is a functional block diagram of one embodiment of the present invention and the connections to other portions of the control system of the present invention.

Referring to FIGS. 4 and 5, one embodiment of the present invention is an apparatus for communication with at least one device 21, 26, 32, and/or 36, which resides on a standard communications network 11, such as an Ethernet network, using a standard communications protocol, such as TCP. The apparatus has a scanner 110, which resides within the element labeled as the "NOE" 100 in FIG. 4. "NOE" stands for Network Options Ethernet module or card. In the embodiment/example shown in FIG. 4, the NOE is a communications card which fits into a backplane 70 having several slots (eight in FIG. 4) for various cards/modules, such as local input modules 25 and local output modules 34, within the control system. One embodiment of the present invention is implemented with software (also referred to as firmware, or Exec), which runs on the NOE module having a microprocessor and memory. However, the present invention can be implemented in various different ways, such as having the scanner 110 residing on the PLC 50, 52 itself, depending on the implementation of the invention. The device scanner is provided for scanning the devices 21, 26, 32, 36, both locally (located on its own backplane) or remotely (over the standard communications network, shown as an Ethernet network in the Figures). A device scan table 120 is provided for storing data relating to the devices 21, 26, 32, 36. A standard communications interface 140, such as a TCP/IP stack with an Ethernet driver, is provided for interfacing between the device scanner 110 and the standard communications network 11 using the standard communication protocol, such as TCP. The Ethernet network embodiment of the present invention uses Ethernet as the device level 11 network. This provides a fast, flexible, and convenient way of interconnecting the I/O devices of different PLCs or I/O modules to the PLCs.

The device scan table 120 includes several parameters which can be used by the scanner 110 to communicate with the devices 21, 26, 32, 36. A listing of the parameters in one specific embodiment of the present invention are provided in a chart further below. Some of these parameters within the scan table 120 are as follows: a first scan parameter is provided for indicating the number of devices 21, 26, 32, 36 to be scanned by the device scanner 110. A second scan parameter is provided for indicating a device type. A third scan parameter is provided for indicating where to retrieve and store data for the devices 21, 26, 32, 36. A fifth scan parameter is provided for indicating the length of the stored data and the retrieved data.

Within the control system, the programmable logic controllers (PLC) 50, 52 communicate between themselves and with other devices using a PLC communication protocol. One such protocol is Modbus, a known protocol. In the present embodiment, the PLC communications protocol is communicated over the standard communications protocol, such as TCP. Detailed information on the Modbus protocol and TCP and TCP/IP can be found on the Internet at www.modicon.com, and other locations, including documentation listed as "Open Modbus/TCP Specification," which is hereby incorporated by reference into the present specification. The standard communications network 11 provides communication between the device scanner 110 and the remote devices 21, 32 and modules 19, 30. Within FIG. 4, element 42 depicts that many other devices can be connected to the standard communications network 11, as is well known. As indicated above, in one specific embodiment of the present invention, the I/O scanner 110 scans the I/O devices by using the Modbus™ protocol (from Schneider Automation, Inc.) over TCP/IP. In this embodiment, the I/O scanner 110 uses the read registers, write registers, and the read/write registers' Modbus commands to move data to and from the PLC memory. This will allow specific types of PLCs within the control system to efficiently transfer repetitive data to Ethernet modules, other types of PLCs, and any other Ethernet TCP/IP device that supports the MB (Modbus) protocol.

The control system shown in FIG. 4 can have numerous PLCs 50, 52. Each PLC 50, 52 typically has a microprocessor and memory (PLC memory such as Random Access Memory—RAM), with software or firmware running therein. Within the embodiment shown in FIGS. 4 and 5, the PLCs 50, 52 each have PLC memory that includes a configuration table. The PLC memory configuration table can have the same parameters listed within the scan table 120 listed above and/or listed within the table of parameters further below. In the embodiment using a configuration table within the PLC memory, the parameters within the configuration table of the PLC memory are read into the scan table 120 upon start-up of the NOE 100 and/or device scanner 110. However, other embodiments of the present invention can have the parameters read into the scan table 120 by other means, such as through a web page (accessible through the world wide web (www)) located on the NOE itself. This type of NOE could generally be called a web-embedded server module. Alternatively, the parameters could be placed into the scan table through a user creating/editing a file on the user's personal computer, and the user could send the file to the NOE using a File Transfer Protocol (FTP) or some other transfer means from a remote location.

In the embodiment shown in FIGS. 4 and 5, the PLCs 50, 52 are adapted to communicate with the local input and output (I/O) devices 26, 36 through the back plane 70, and with the remote input and output (I/O) devices 21, 32 through the back plane 70, the NOE 100, the network 11, and the I/O modules 19, 30 on the network 11. The NOE 100 in the embodiment in FIGS. 4 and 5 is adapted for communication with the PLC 50, 52, the local input and output devices 26, 36, the Ethernet network, 11 and the remote input and output devices 21, 32. As stated above, and as will described in detail further below, the NOE server module 100 has a scanner 110 for scanning the input and output devices, an I/O scan table 120 for storing real time and other information for the input and output devices, a standard communication protocol interface 142 and a standard communication network driver 144 for interfacing between the I/O scanner 110 and the standard communication network 11 using the standard communication protocol. The standard communications network driver 144 can be a commercially available AM79C961 Driver.

In the embodiment shown in FIGS. 4 and 5, the NOE module 100 also has a real time operating system for running the various tasks on the NOE, including the "IO scan task" or scanner 110. Commercially available operating systems can be used, such as the PSOS real time operating system manufactured by Integrated Systems, Inc. of Sunnyvale, Calif. Information on the PSOS real time operating system is available from this company and/or on the Internet at www.isi.com. One preferred real time operating system that can be used is VXWORKS provided by a company named Wind River Systems, Inc. of Alameda, Calif. VXWORKS has been used within the QUANTUM product line of Schneider Automation, Inc., the Assignee of the present invention. Some of the embodiments of the present invention do not need a real time operating system, such as the "M1" product line of Schneider Automation, Inc., in which case, the firmware runs on a processor without the assistance of the real time operating system.

In one embodiment, the operation of the scanner 110 is configured using a commercially available panel software applications, such as Modsoft™ or Concept™. The panel software is used to input the information about I/O devices, which are to be scanned by the NOE, that is, to be written to and read from.

In a particular embodiment of the present invention, the scan table 120 includes: the number of 16-bit words that the device accepts as input or produces as output; the source or destination address in the controller memory space (referred to as OX, IX, 3X, or 4X Registers); the timeout value for a device, which is the amount of time which is allowed to elapse before a device is considered to be unhealthy; a flag to indicate what to do with input data when a device has stopped responding, the two choices are HOLD or ZERO. This implementation produces the IP address of the device from its Modbus address as follows:

Device's IP Address: AA.BB.CC.MB

AA.BB.CC is the 1$^{st}$ 3 octets of this NOE's IP address, and MB is the Modbus Address which has been entered with the panel software. A further embodiment includes the ability to directly enter the remote I/O devices, IP addresses, as well as the device types.

A TCP connection shall be reserved for each I/O device in the scan list, until the maximum of 128 devices are reached. As used within this specification, FC 3 means function code 3, which is a MB (Modbus) read register message. Likewise, FC 16 means function code 16, is also an MB write register message, and FC 23 means function code 23, which is an MB read/write message. The preferred embodiment of the present invention is capable of supporting Peer Cop, the name of a particular control system arrangement of Schneider Automation, Inc., which is described in U.S. patent application Ser. No. 60/078,223, entitled Communications System For A Control System Over Ethernet And IP Networks and Communications Interfaces for Such Systems," which is hereby incorporated by reference into the present specification. Additional information on "peer cop" is also available on the Internet at www.modicon.com, which is hereby incorporated by reference herein. In this embodiment, the user can use the peer cop input screens in the panel software to configure the NOE, including the I/O scan table, although there are other ways to configure the NOE, as are described within the present specification.

Figure 6:
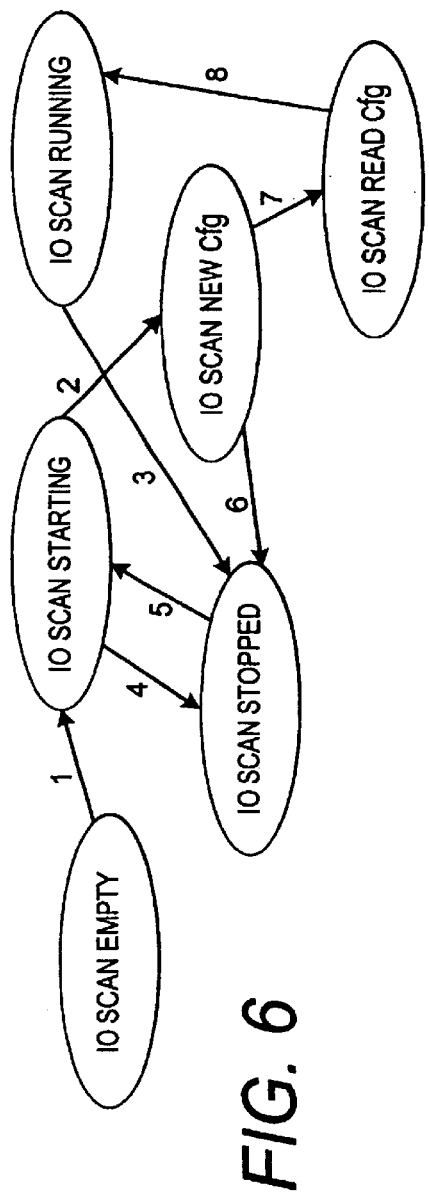
FIG. 6 is a state diagram of the control states of a scanner of present invention.

The general setup and flow of the I/O scanner software/firmware is shown in FIG. 6. The following next state transition table indicates the next states of the next state diagram of FIG. 6.

| Current State | Next State | Trigger Number | Trigger |
| --- | --- | --- | --- |
| IOScan Empty | IOScanStrarting | 1 | Exit Dim |
| IOScanStarting | IOScanNewCfg | 2 | New Cfg. From controller and Controller is running |
| IOScanRunning | IOScanStopped | 3 | Controller Not Running |
| IOScanNewCfg | IOScanStopped | 6 | Controller Not Running |
| IOScanStarting | IOScanStopped | 4 | Controller Not Running |
| IOScanStopped | IOScanStarting | 5 | ExitDim |
| IOScanNewCfg | IOScanReadCfg | 7 | IOScanState still IOScannewCfg |
| IOScanReadCfg | IOScanRunning | 8 | IOScanState still IOScanReadCfg and Open IOScan connections |

In one embodiment, the I/O scanner 110 utilizes the event flag capability of the PSOS real-time operating system (RTOS). This allows up to 16 user defined events to be posted to a task. The I/O scanner interface to the backplane (BP) driver is via a call-back function. The BP driver calls the call back function to interface to the I/O scanner 110. The call back function posts the appropriate event to the I/O scanner 110. The I/O scanner 110 runs in a forever loop, checking for events. If an event is posted, the I/O scanner 110 carries out the appropriate function. The event flag communication within the PSOS RTOS does not provide the full functionality of the message queue communication method, but requires much less system resources. Event flags do not need to be queued in this embodiment.

The I/O scanner 110 utilizes the services of a client task 160 to implement I/O scanning. The client portion or task 160 is the portion of the NOE 100 which handles the "client" tasks. For example, the user can write a control program for the PLC 50 which, as a part of the operation of the program on the PLC, the PLC will send/receive a Modbus message to/from the backplane 70, and these types of messages will be handled by the client task 160 to/from TCP/IP stack 142 and Ethernet driver 144. Parameters are used to pass pointers for connection list and connection arrays.

With reference to the above next state transition table and FIG. 6, there is no processing required during the IOScanEmpty state. The backplane driver initializes the I/O scan table 120 through existing or created configuration data located elsewhere, as has been described herein. During the IOScanNewCfg State the I/O scanner disables interrupts, and tests to see if the state is still IOScanNewCfg. If the state is IOScanNewCfg, the IO scanner 110 task changes the IO Scan state to IOScanReadCfg, and re-enables interrupts. The I/O scanner 110 also performs the necessary housekeeping, to remove any previously used open connections. If the test for IOScanNewCfg fails, then the IO scanner 110 re-enables interrupts and exits. The I/O scanner 110 copies the IO scan data structure to its own local variable to ensure that here will not be a contention issue with the BackPlane Driver trying to access the data at the same time.

Another aspect of present invention includes a "peer" determination portion that, among other things, was implemented to allow for versatility of the control system. As will be described in greater detail below, one particular embodiment of the present invention includes using two determinations to determine whether a device (in the scan list) is a peer: (1) Does the device understand the Modbus read/write register command (Function Code 23) and (2) does the information in the scan table 120 match the communication that the remote device is directing at this node? If these two conditions are met then the device is determined to be a "peer" device.

Figure 7:
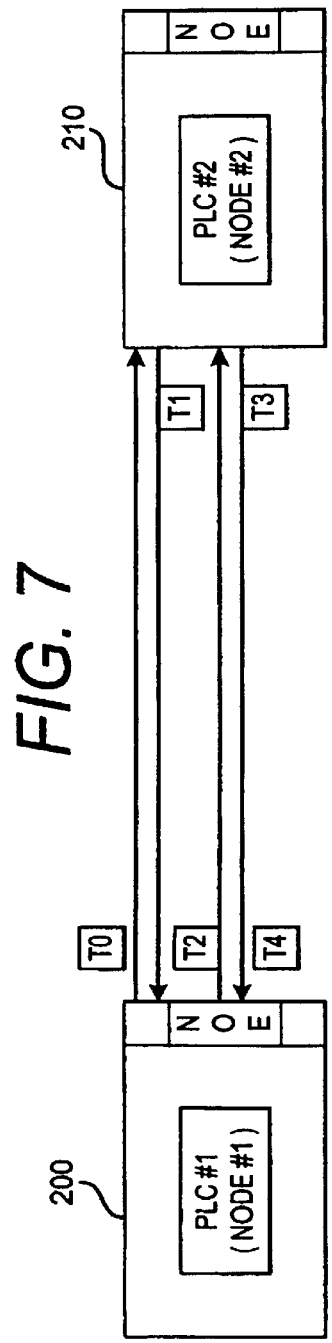
FIG. 7 is functional block and timing diagram of one embodiment of peer device determination of the present invention.
Figure 8A:
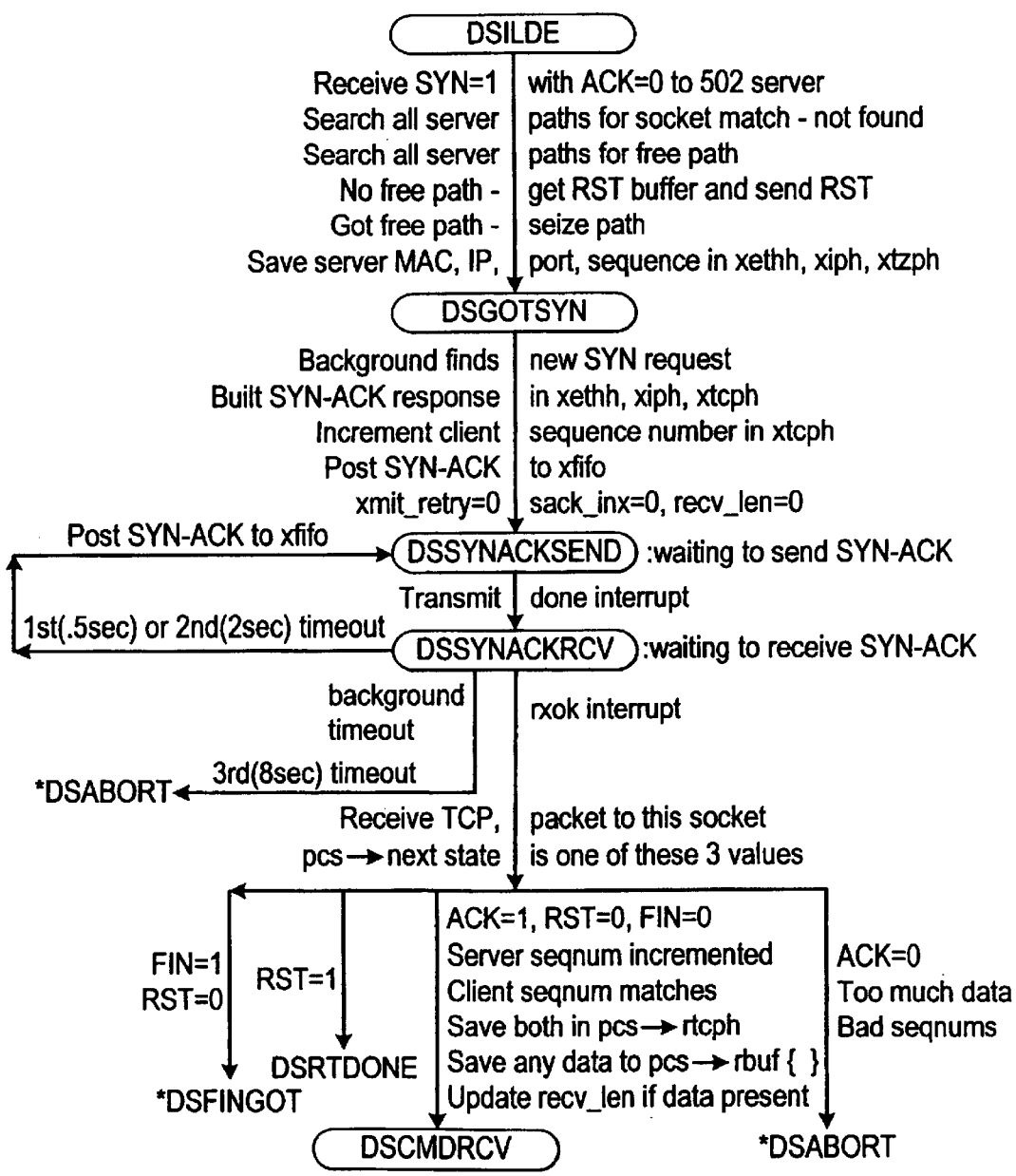
FIGS. 8A–8G are a detailed flowchart of the one embodiment of software code running on one embodiment of the scanner of the present invention.
Figure 8B:
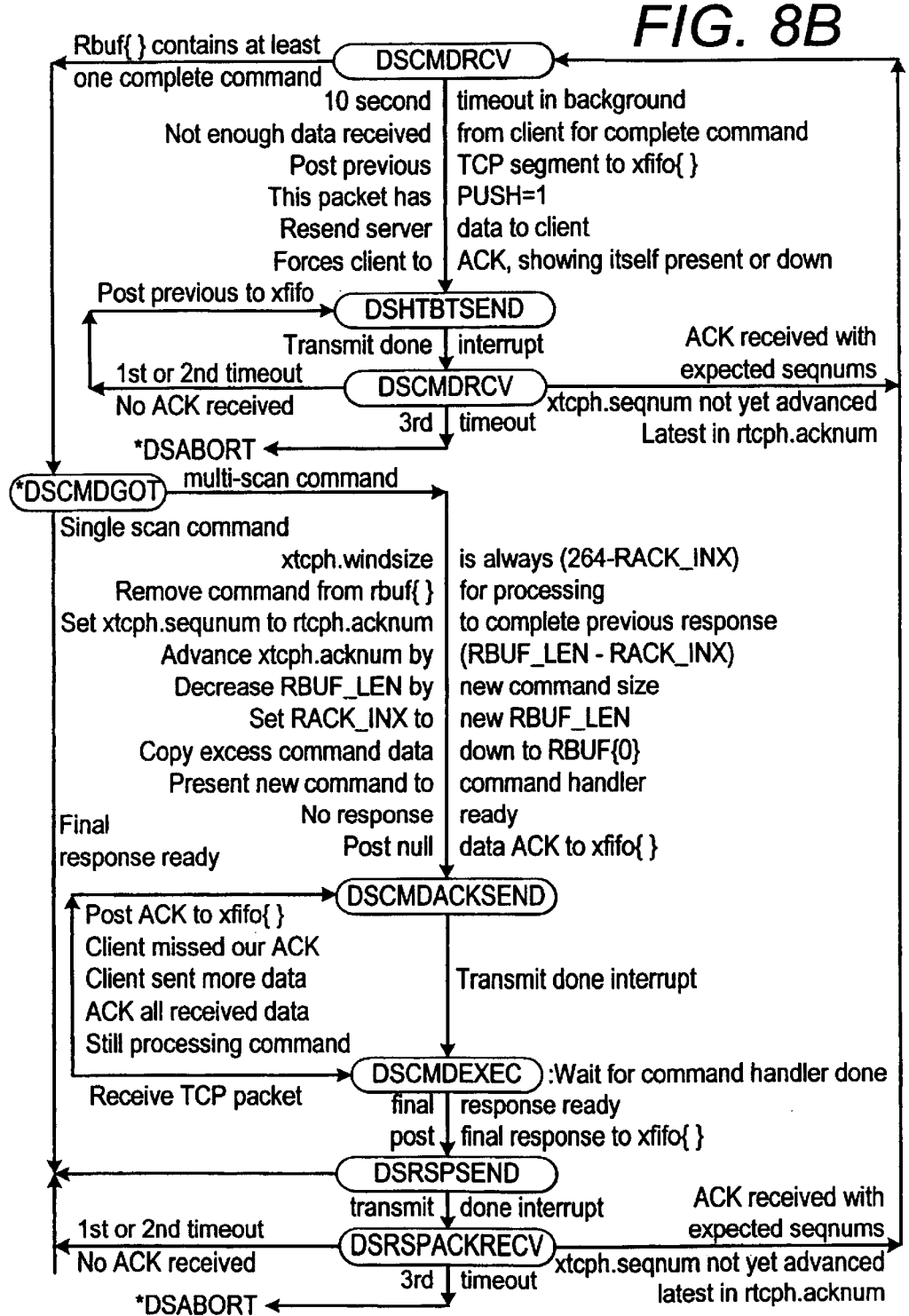
Figure 8C:
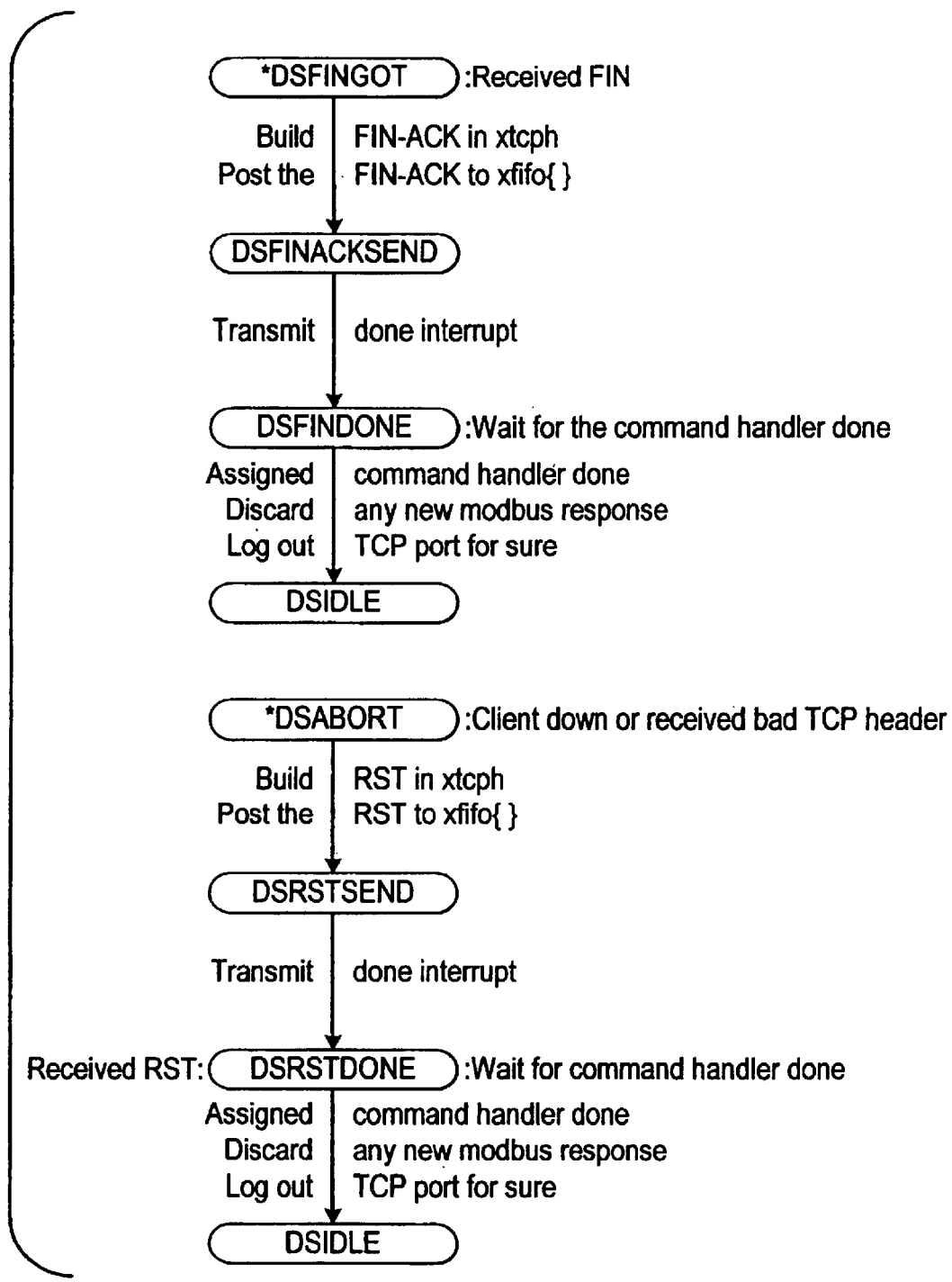
Figure 8D:
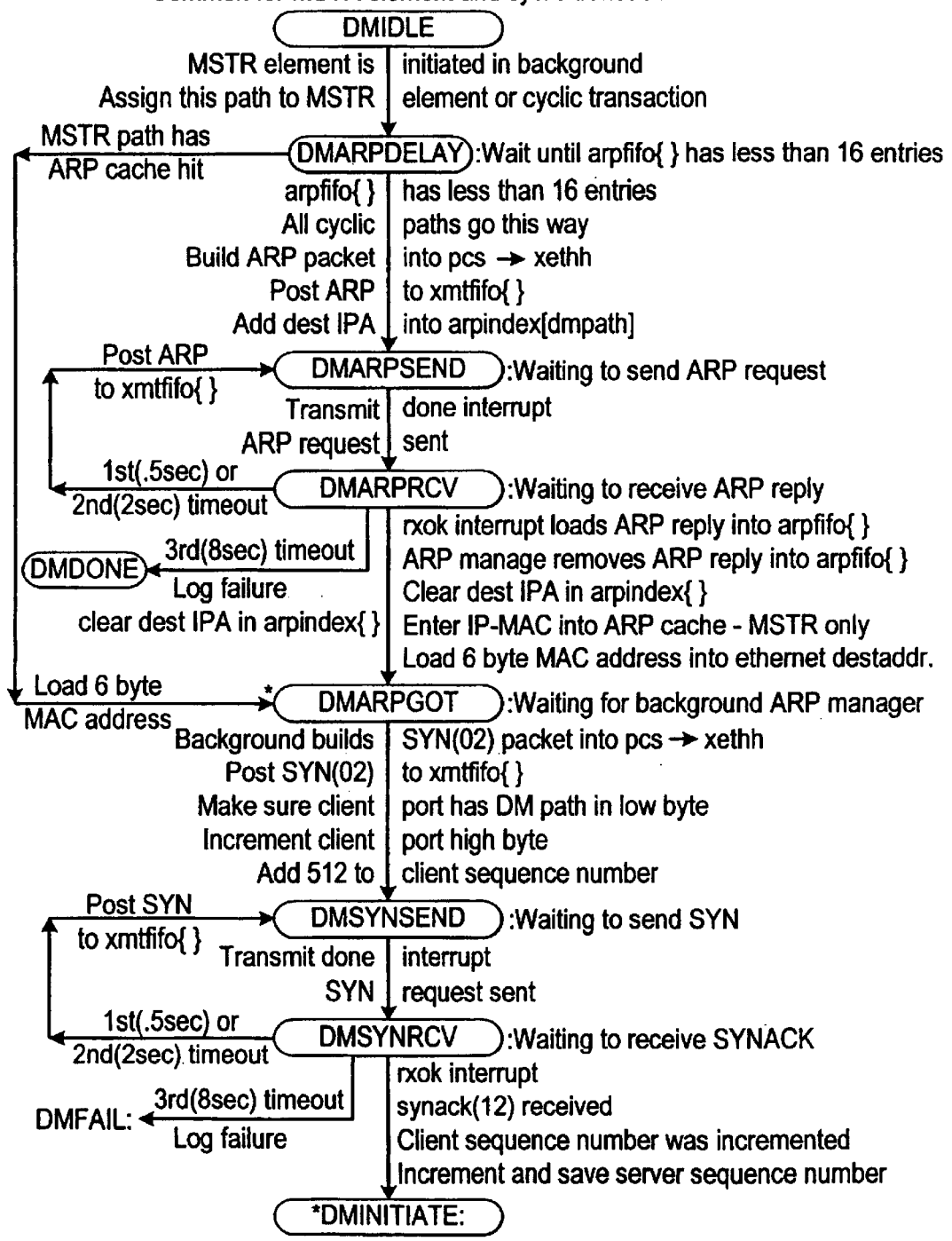
Figure 8E:
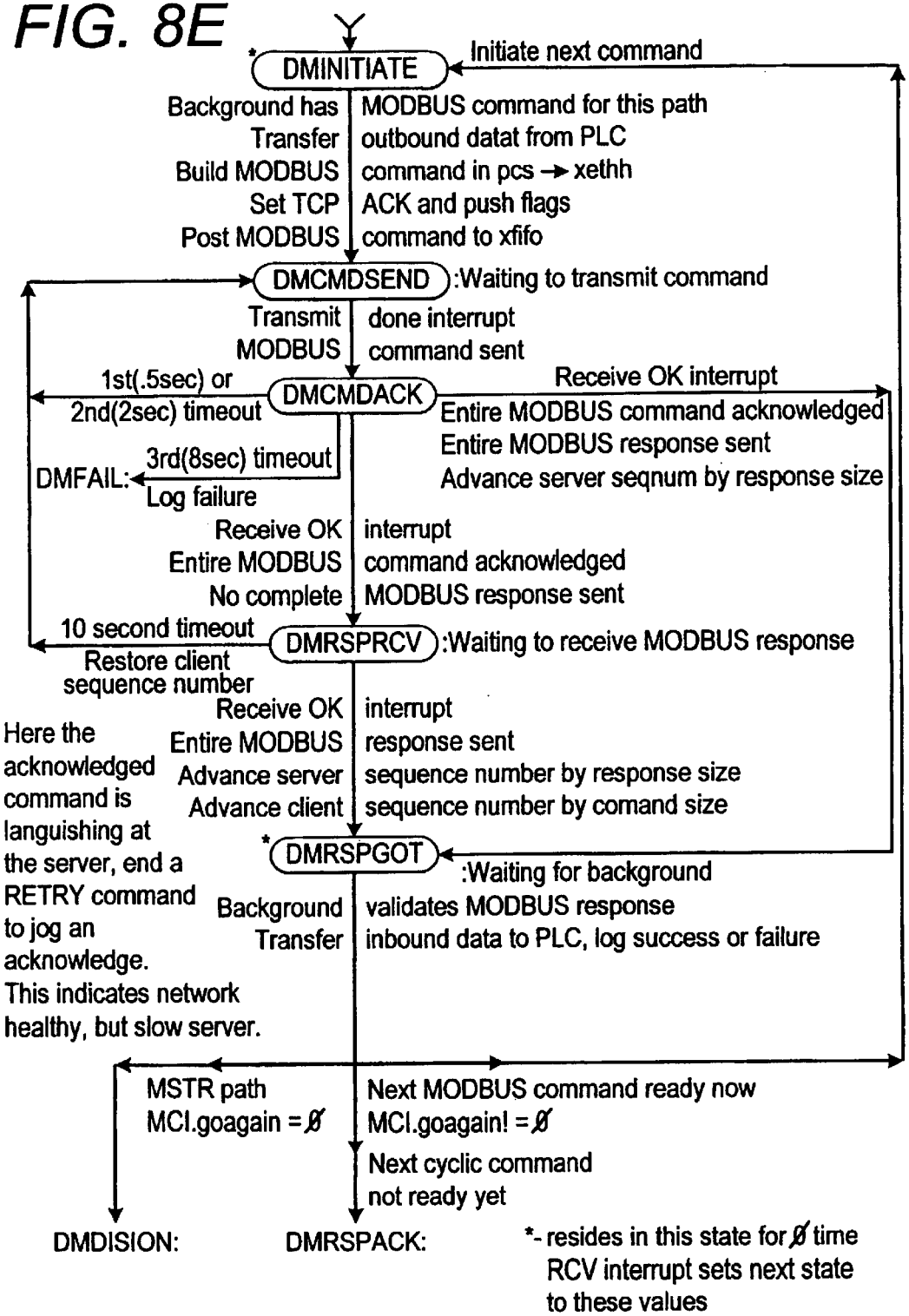
Figure 8F:
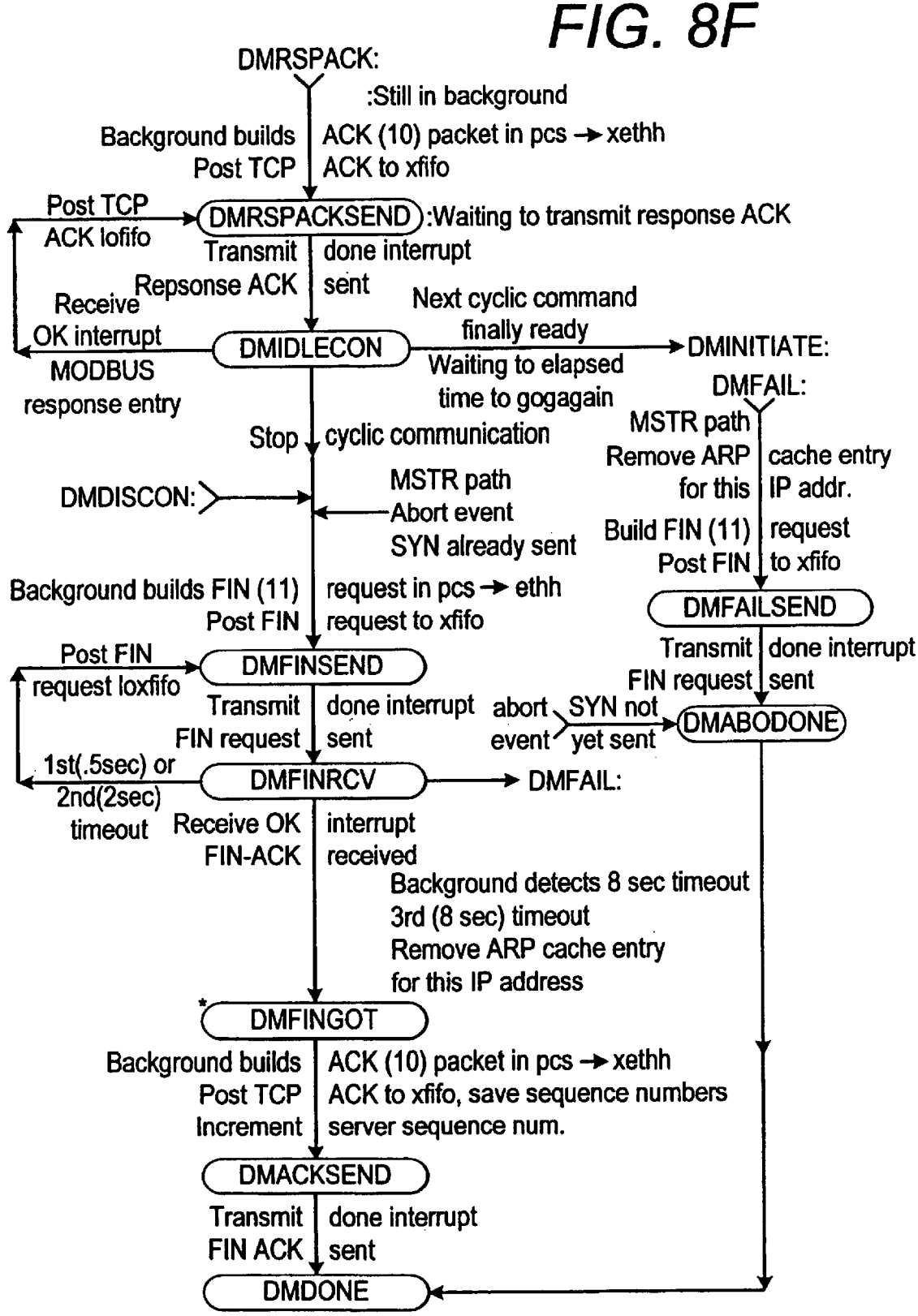
Figure 8G:
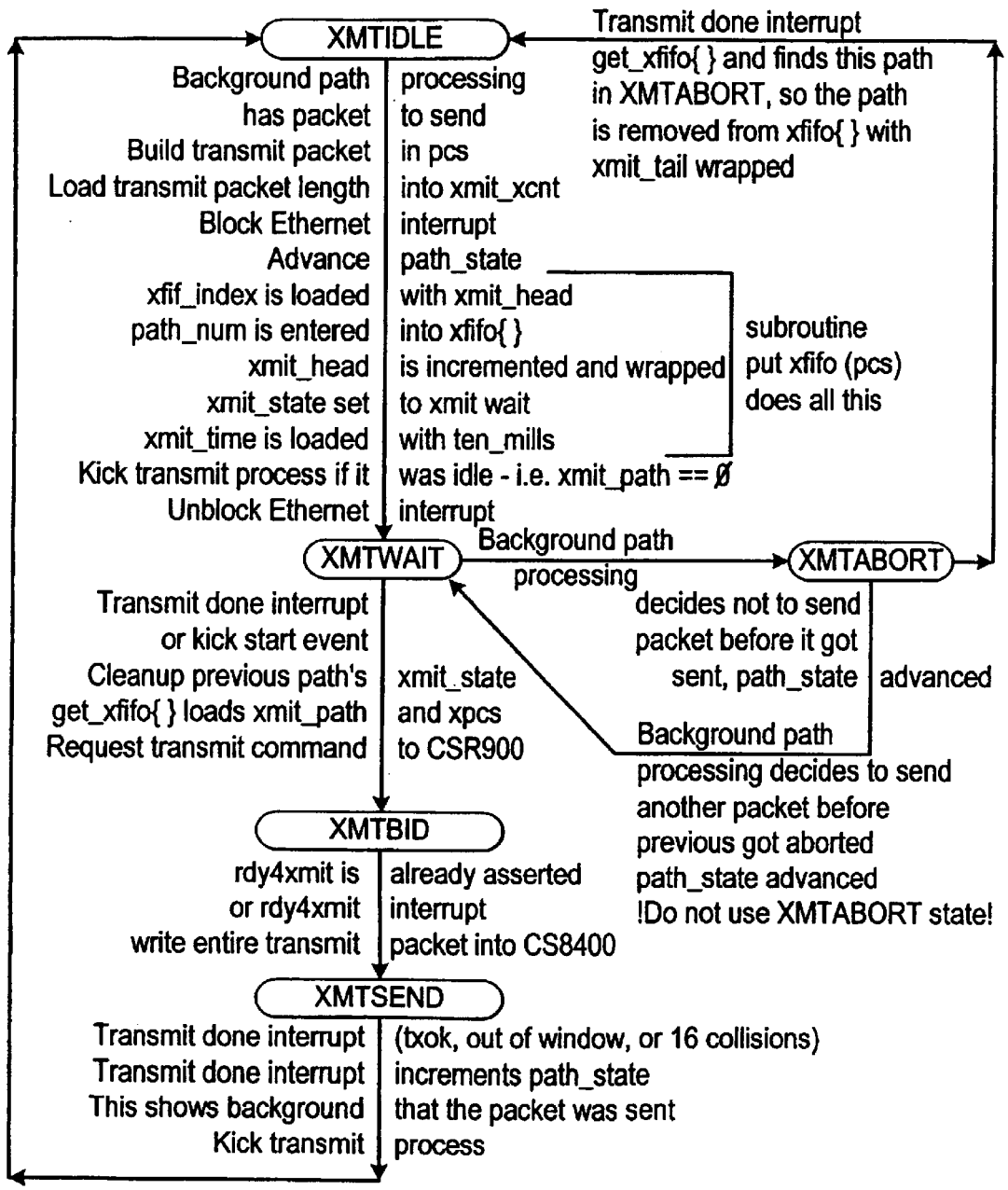

Referring to FIG. 7, in view of FIGS. 4 through 6, in general, the present invention is a method for identifying a second device 210 on a second node of a standard communications network 11 from a first device 200 located on a first node of the standard communications network 11. The method first initiates from the first node a first communications command in a peer protocol format to the second node. The method then responds to the first communications command from the second node to the first node. The method then initiates from the second node a second communications command in the peer protocol format to the first node. The method then responds to the second communications command from the first node to the second node. The method then identifies the second device on the second node as a peer device within the first device on the first node, and the method identifies the first device on the first node as a peer device within the second device on the second node. The method then sets the first node to an active status, and sets the second node to a passive status. In one embodiment, the peer protocol format can be a programmable logic controller (PLC) format, the peer device can be a programmable logic controller (PLC) device, the peer protocol format can be Modbus, and the standard communications network can be Ethernet.

The present invention is also a device scanner 110 for a first device 200 located on a first node of a standard communications network 11, for scanning devices on the standard communications network 11, and for identifying a second device 210 on a second node of the standard communications network 11. The device scanner 110 has an initiator for initiating a first communications command in a peer protocol format to the second node, a receptor for receiving from the second node a second communications command in the peer protocol format, in response to the first communications command, and an identifier for identifying the second device 210 on the second node as a peer device. The device scanner 110 can have the scan table 120 of prior embodiments built into the device scanner 110 or as a separate portion of the system for storing parameters relating to the devices. As in prior embodiments, the scanner 110 uses one or more of the parameters for scanning the devices.

In one particular embodiment, if communication has been initiated by a device which is in the scan table 120, that is, a device which this NOE 100 has been configured to also communicate with, then the peer determination test is performed. As indicated above, the peer determination includes at least the following aspects: 1) Does the remote device understand the read/write register command? 2) Does the communication from the remote device match the characteristics of this scan table 120. That is, does the write length match the read length in the scan table, and does the read length match the write length in the scan table 120. If (1) and (2) are met then the device is flagged as a "peer." There are two peer types: peer active and peer passive. The active peer takes over the task of initiating the scanning, while the passive peer only keeps track of the health of the active peer.

More particularly, as a part of its operation, the I/O scanner 110 determines during initialization whether an I/O device listed in the I/O scan table 120 is a peer device, which will actively initiate transfers, or a simple slave device, in which case the I/O Scanner must issue MB reads or writes to get or receive data. To determine peer status, the I/O scanner 110 issues a MB read/write request (which is FC 23) to the I/O device. If the I/O device responds with an exception indicating that it does not support the read/write request, then the I/O device is assumed to be a simple device, and therefore this I/O scanner 110 must initiate all requests for input data. If the device responds positively then it may or may not be a peer. The next qualifying event to declare the I/O device a peer is the arrival of a read/write request from the peer I/O device. If the read/write request is received and the input and output length match the configuration in this I/O scanner's scan table 120 then the device is declared a peer.

As briefly mentioned above, when a device is declared a peer, then the I/O devices IP addresses are used to decide which I/O device will be "active" and which I/O device will be "passive." By convention, the I/O device with the lower IP address will become active (lower=active) and the device with the higher IP address will become passive (higher=passive) in the I/O scanning process. The active device initiates the read, write, or read/write request to the passive I/O device. The passive device accepts/provides data in response to the active I/O device's requests. FIG. 7 shows the timeline for the peer determination:

T0-Node #1 initiates a Read/Write MSTR to Node #2.
T1-Node #2 responds to Node #1's request.
T2-Node #2 initiates a Read/Write MSTR to Node #1.
T3-Node #1 responds to Node #2's request.
T4-Node #1 declares Node #2 a Peer.
Node #2 then declares Node #1 a Peer.
Node #1 then becomes active and Node #2 becomes peer passive.

The following provides additional detail of one embodiment of the scanner 110 and scan table 120 of the present invention. The I/O scan table 120 allows up to a maximum of a 128 input devices and a maximum of 128 output devices. The I/O scan table allows up to a 100 words of data to be sent to or from a device in the I/O scan table 120. The format of the I/O scan table 120 is as follows:

| Entry Name | Data Type | Description | Default Value |
| --- | --- | --- | --- |
| IODevType | Uint8 | Device Type: Indicates the type of IO device | SLAVE_INPUT |
| Ipaddr | Uint32 | IP address of IO Device | Derived from MB+ address |
| MbpAddr | Uint8 | MB+ Address of IO Device | Value from Peer Cop Table |
| LastRespRecv | Uint8 | Flag indicating whether the IO device responded to the last MB message | Reset when MB message sent. Set when response received |
| HealthTimeOutValue | Uint16 | Indicates the amount of time t wait before declaring an IO device unhealthy | Value from Peer Cop Table |
| Status | Uint8 | Indicates the status of the IO Device: UNCONNECTED, CONNECTED, TIMEDOUT. | UNCONNECTED |
| HealthTimer | Uint16 | Used internally for current value of Health Timer | Updated once per scan. LSB is 16.67 mSec (from KC_TICKS2SEC). |
| InputLocalRefNum | Uint16 | Local state RAM reference | Value from Peer Cop Table |
| InputRemoteRefNum | Uint16 | Remote state RAM reference | 0x00 |
| InputLength | Uint16 | Length of Input Data | Value from Peer Cop Table |
| HoldLastValue | Uint8 | Indicates whether to hold the last value, or reset value to 0 when IO device is declared unhealthy | Value from Peer Cop Table |
| NewInputDataAvailable | Uint8 | Indicates whether new input data has been received | Set when new data received, cleared when data is given to BP Driver. |
| IOScanDataInTblIndex | Uint16 | Index into the IO Scan Input Data Table | Derived at initialization time |
| OutputLocalRefNum | Uint16 | Local state RAM reference | Value from Peer Cop Table |
| OutputRemoteRefNum | Uint16 | Remote state RAM reference | 0x00 |
| Output Length | Uint16 | Length of Output Data | Value from Peer Cop Table |
| IOScanDataOutTblIndex | Uint16 | Index into the 10 Scan Output Data Table | Derived at initialization time |

During the IOScanReadCfg state, the I/O scanner 110 initializes the connection and transaction arrays, then transitions to the IOScanRunning state. During the IOScanRunning state, the I/O scanner is issuing write/read registers(FC 23) to I/O devices in the scan table 120 that have both inputs and outputs, write4x register, and read4x register commands to I/O devices the scan table 120. The data received back from the read4x responses is sent to the backplane driver to update the controller memory.

The following describes with more particularity the peer active processing of one embodiment of the present invention. In the I/O peer case, the initial FC 23 from the peer, of the peer determination will be received by the server or server task 190, as well as, the FC 23s from peer active devices. The server 190 will determine whether the device associated with an incoming FC 23 is in the I/O scanner's I/O scan table 120. If it is, the server 190 will take control of the I/O scan table 120 by using the I/O scan table semaphore. Once the server 190 has control of the I/O scan table 120, the server 190 will determine whether the device associated with the incoming FC 23 is already flagged a peer, or is listed as a slave.

If the device is listed as a slave in the I/O scan table, then this FC 23 is part of the peer determination The server 190 then posts a IOSCAN_PEER_DETERMINATION_EVENT to the I/O scanner 110. Upon receipt of the IOSCAN_PEER_DETERMINATION_EVENT the I/O scanner 110 will update the status of the device to either peer active or peer passive, based on the IP addresses. If the device is listed as peer active, then this FC 23 is the I/O scan data associated with this peer. The server 190 will take control of the I/O scan table 120 by claiming the semaphore. The server 190 will write the new data into the 110 scan table 120 and update the NewInputDataAvailable flag. The server 190 will then release the I/O scan table 120 semaphore. If the output data length is non-zero, the server 190 will take control of the I/O scan table 120, and write the output data in the response to the FC 23 to the peer. The I/O scan table 120 can be broken down into two or more groups in order have the server 190 and/or the scanner 110 take control of only one or more groups therein and allow for access of the other groups by the other task. In peer passive, the response to the peer data exchange is received directly by the IO scanner 110, and is treated the same as the slave case.

The following describes with more particularity the input device scan operation of one embodiment of the present invention. While the I/O scanner 110 is in the IOScanRunning state, the BP driver sends an event to the I/O scanner 10 at each End of Scan (EOS). The transmission of the request for data for each input in the Scan Table is performed at the EOS. The I/O scanner 110 sends a FC 23 or FC 3 for each slave input, and peer active input in the scan table 120, if the device has responded to the previous request for data. The I/O scanner 110 clears the I/O data received flag for each request that is sent. The input data that is received as a result of the FC 23 or FC 3 commands that were transmitted will cause a IOSCAN TCIP_EVENT to be caused. This event is generated by the TCPSignalHandler function. The IOSCAN_TCIP_EVENT is handled by the I/O scanner 110 by determining which connection the response was received over, and setting the I/O data received flag for that device. The health timer is reset, and the health bit is set for the device.

The following describes with more particularity the ouput device scan operation of one embodiment of the present invention. Following the input device scan operation, the output devices are scanned. The output data is sent to each slave output, and peer active output in the scan list if the device has acknowledged the previous output data. When a device on the output scan list acknowledges the receipt of the output data, the health timer for the device is reset, and the health bit is set.

To maintain consistency for all output data sent each scan, the I/O scanner 110 double buffers the output data before the starting the output of the data for each scan. Thus, if the BP driver updated part of the output data, while the I/O scanner 110 was in the middle of a transmission, the current set of data being output would not be affected.

The following describes with more particularity the I/O device health information operation of one embodiment of the present invention. The health timer for each device is initially set to the health time-out value in the I/O scan table 120. The real time operating system timer 150 capability is used to maintain the health timers for each device in the I/O Scan table 120. The RTOS 150 system timer is configured to generate an event to the I/O scanner 110 every 16.67 mSec. This is accomplished via the tm_evevery(unsigned long ticks, unsigned long events, unsigned long *tmid) function call(see PSOS documentation for more details). This configures a timer that will automatically reload. Every time the timer expires, an event is generated to the I/O scanner 110 indicating that the health timers need to be decremented. Following the update, any device whose health timer has expired, are flagged as bad by resetting the health bit for the device. Any time data is received from an input device or an acknowledge is received from an output device, the health timer for that device is set to the initial health time-out value. In order to use the I/O device health information with the current MSTR to get "peer cop" health, a 128 bit array will be used to provide health information for 128 devices. Otherwise, health will be provided for the first 64 devices. The I/O scan table 120 will be sorted for ascending IP addresses. Each bit in the 128 bit array indicates the health of one of the I/O devices. The I/O scanner 110 is capable of 1,000 transactions per second.

The following provides additional information on the relationship between the I/O scanner 110, the server 190, and the backplane driver 180. In one embodiment of the present invention, three components are used to perform I/O scanning: the backplane driver 180, the server 190, and the I/O scanner 110. A double buffer scan table and a double buffer output table is used. The double buffer output table is used for outgoing write requests. An input table is also used for outgoing read requests. A health array is also used. When the configuration changes, the backplane driver 190 copies the configuration from the PLC 50 into one configuration table while the client and server tasks are using another configuration table. When the backplane driver 190 has completed copying the configuration, it signals the client I/O scanner 110 task by setting the event flag. The client task 160 then swaps the tables, and the new table will also be used by the server 190. It is the client task 160 that determines which tables (configuration and output) are used by the server 190 and backplane driver 180. It does this with one variable for the configuration table and another variable for the output table. The server 190 and backplane driver 180 reads the appropriate variable and determines the table to use, and the client task 160 sets the appropriate variable. The server 190 examines if the read, write or read-write request from the remote node has a corresponding entry in the scan table 120. If not, the request is processed in the normal manner by passing the request to the backplane driver 180. If there is a corresponding entry, the server 190 processes it using the input and output tables. To save bandwidth, the server 190 compares its IP address with the remote node. If its IP address is greater than the remote node, it goes into passive mode, and changes the state in the scan table 120. At a later time, when the client task 160 notices that its in a passive state, it no longer sends modbus requests to the remote node. Thus, bandwidth is saved by sending less messages.

Referring back to embodiment in FIGS. 4 and 5, the I/O scanner 110 handles the cyclic communication, the server 190 communicates directly with a dual port RAM and an ASIC which is directly connected to a bus that runs accross the backplane 70 which in turn connects to the PLC 50. The backplane driver 180 handles communication to/from the controller. As discussed above, the PLC 50 has configuration tables which stores, at least, the number of devices to be scanned, whether a device is an input, and output, or and input and output device. If a device is an input, the table stores where in the controller's memory to store the data. If the device is an output, the table stores where in the memory to retrieve the data. If the device is both an input and output device, the table stores both. The configuration table also stores the length (in bytes) of the input and output data. As described in detail above, the configuration table also includes a health timeout parameter for each device. If there is no response to a read/write to an I/O device within the timeout parameter amount, the device can be "flagged" as unhealthy in the NOE 100. The NOE 100 keeps track of the dynamic health status.

In this embodiment, the configuration table is scanned by the NOE 100, and then the NOE 100 operates according to those parameters. The controller (PLC) 50, 52 runs in a cyclic manner, and it handles the updating of the inputs and outputs once per scan. At the end of each scan, the controller gives an indication tp the NOE 100 that the controller is at the end of a scan, and the NOE 100 then takes a snapshot of all of the available outputs and copies the outputs into its local memory. The NOE 100 then generates messages to update all of the output devices that are in the I/O scan table. The NOE 100 also takes the current values for all of the input devices (after sending read messages for all of the input devices) and the NOE 100 updates the controller 50 with all of the new input data.

In FIG. 5, there is an indication of a "semaphore controlled" I/O scan table 120. This term was briefly mentioned above. The scan table 120 needs to be available to both the I/O scanner 110 and the server 190 because the server 190 needs to be able to talk to a "peer" device that is generating messages. Those messages will go to the server 190 first (before the I/O scanner 110). Generally, the server 190 receives requests on the Modbus port 502 from other controllers 50, 52 and NOEs 100. Continuing, in order to prevent both the server 190 and the I/O scanner 110 from accessing the I/O scan table 120 at the same time, a control mechanism is provided to control "ownership" of the table at any one time by either the I/O scanner 110 or the server 190. If this is not done, problems with consistency of the data and its use may arise.

The client task 160 is a portion of the NOE 100 that handles "client" tasks. A described above, users of the controllers will create programs to run on the controllers. The programs can be written to send Modbus messages over TCP. The controller 50, 52 will send a message to the backplane 70 (type of message will be handles by the client task 160) and the client task 160 will send the message onto the TCP/IP over Ethernet network. A message will then come back from the TCP/IP over Ethernet network, the client task will handle the return message, and send it onto the controller 50, 52 for use by the program running on the controller 50, 52. The Client Connection Function Library 128 is a library of functions which are used to format and unformat messages to/from the format on the backplane 70 handled by the backplane driver 180, as well as the format of the TCP/IP stack 142, including the handling of the Modbus format.

A detailed flow diagram (chart) of one embodiment of the I/O scanner 110 of the present invention is shown in FIGS. 8A through 8G, as one of ordinary skill would understand. This embodiment does not need to use an RTOS 150 for its operation, and thus includes some additional routines for handling. The program of this detailed flow diagram can be loaded into flash program firmware memory on the NOE.

While specific embodiments have been illustrated and described, numerous modifications come to mind without significantly departing from the spirit of the invention and the scope of protection is only limited by the scope of the accompanying claims.

Reference to Appendices

Appendix A, which is part of the present disclosure, consists of 2 pages and is a source code listing of one embodiment of an include file for the hot-standby task in the present invention, which is described in more detail above.

Appendix B, which is part of the present disclosure, consists of 9 pages and is a source code listing of one embodiment of a main module for the hot-standby task in the present invention, which is described in more detail above.

A portion of the disclosure of this patent document contains material, that includes, but is not limited to, Appendix A and Appendix B, which is subject to copyright protection. The copyright owner has no objection to the facsimile reproduction by anyone of the patent document or the patent disclosure, as it appears in the United States Patent and Trademark Office patent file or records, but otherwise reserves all rights.

We claim:

1. A method of providing an active standby control system comprising the step of:

providing a first and a second programmable logic controller, each programmable logic controller having an operating state, an I/O scanner having a connection to a remote I/O head, and a hot standby nodule, wherein each programmable logic controller's hot standby module is operably connected together, operably connecting each programmable logic controller to a network;

assigning a network address identifier to each programmable logic controller, wherein the network address identifier is a Media Access Control address;

placing the first programmable logic controller in primary mode and the second programmable logic controller in secondary mode;

sensing the operating state of each programmable logic controller;

exchanging the network address identifiers between the first programmable logic controller and the second programmable logic controller upon detection of a failure in the first programmable logic controller; and resetting the connection between the I/O scanner and the remote I/O head in the first primary programmable logic controller prior to exchanging the network address identifiers.

2. The method of claim 1 wherein each programmable logic controller comprises a network module board operably connected to the network and a control unit.

3. The method of claim 2 wherein the network is an Ethernet network.

4. A hot standby system for a control system, comprising: a first and a second programmable logic controller, each programmable logic controller including:

a network module board having a network address identifier, wherein the network address identifier is a Media Access Control address;

a control unit having an operating state;

an I/O scanner having a connection to a remote I/O head; and a hot standby module, the hot standby module of each programmable logic controller being operably connected together;

means for assigning the address identifier to each network module board;

means for operably connecting each network module board to a network;

means for sensing the operating state of each control unit, and exchanging the network address identifier of the first programmable logic controller and the network address identifier of the second programmable logic controller upon detection of a failure in the first programmable logic controller; and means for resetting the connection between the I/O scanner and the I/O head in the first programmable logic controller prior to exchanging the network address identifiers.

5. The hot standby system of claim 4 wherein the network is an Ethernet network.

6. A method of providing an active standby control system comprising the steps of:

providing a first and a second programmable logic controller, each controller having an operating state and an I/O scanner having a connection to a remote I/O head;

operably connecting the first and second programmable logic controllers to each other and to a network;

assigning a network address identifier to designate each programmable logic controller wherein the network address identifier is a Media Access Control address;

placing the first programmable logic controller in primary mode and the second programmable logic controller in secondary mode;

sensing the operating state of the primary mode programmable logic controller;

swapping the network address identifiers between the first and second programmable logic controllers upon detection of a failure in the first programmable logic controller, and placing the second programmable logic controller in primary mode;

resetting the connection between the I/O scanner and the remote I/O head in the first primary programmable logic controller prior to swapping the network address identifiers; and transmitting reverse address resolution protocol (RARP) messaging to the network, wherein the newly designated programmable logic controller resume network operations.

7. The method of claim 6 wherein the network is an Ethernet network.

8. The method of claim 6 further including the step of aborting all connections to the first and second programmable logic controllers.

9. An active standby system for a control system, the active standby system comprising:

a first and a second programmable logic controller, each programmable logic controller having a network module board, each network module board having a separate network address identifier, wherein the network address identifier is a Media Access Control address, each network module board is operably connected to a network, each programmable logic controller comprising:

a control unit having an operating state;

a remote I/O head;

a hot standby module, the hot standby module of each programmable logic controller is operably connected to each other and to the network, and is configured wherein the network address identifier of each network module board is exchanged upon detection of a failure in the first programmable logic controller; and and I/O scanner having a connection to the remote I/O head, wherein the first programmable logic controller is configured to reset the connection prior to an exchange of the network address identifiers.

10. The active standby system of claim 9 wherein the network is an Ethernet network.

11. The active standby system of claim 9 wherein the network module is operably connected to the network by a switch.

* * * * *